US008560608B2

(12) United States Patent
Petersen et al.

(10) Patent No.: US 8,560,608 B2
(45) Date of Patent: Oct. 15, 2013

(54) CROWD FORMATION BASED ON PHYSICAL BOUNDARIES AND OTHER RULES

(75) Inventors: Steven L. Petersen, Los Gatos, CA (US); Eric P. Halber, Morrisville, NC (US); Eugene Matthew Farrelly, Cary, NC (US)

(73) Assignee: Waldeck Technology, LLC, Portsmouth, NH (US)

( * ) Notice: Subject to any disclaimer, the term of this patent is extended or adjusted under 35 U.S.C. 154(b) by 336 days.

(21) Appl. No.: 12/941,457

(22) Filed: Nov. 8, 2010
(Under 37 CFR 1.47)

(65) Prior Publication Data

US 2012/0066302 A1    Mar. 15, 2012

Related U.S. Application Data

(60) Provisional application No. 61/258,838, filed on Nov. 6, 2009.

(51) Int. Cl.
*G06F 15/16* (2006.01)
(52) U.S. Cl.
USPC ............... 709/204; 455/435.1; 455/435.2; 455/457; 705/14.52; 705/14.58
(58) Field of Classification Search
USPC ............... 709/204; 455/457, 435.1, 435.2; 705/14.52, 14.58
See application file for complete search history.

(56) References Cited

U.S. PATENT DOCUMENTS

| 5,539,232 | A | 7/1996 | Nakanishi et al. |
| 6,204,844 | B1 | 3/2001 | Fumarolo et al. |
| 6,240,069 | B1 | 5/2001 | Alperovich et al. |
| 6,529,136 | B2 | 3/2003 | Cao et al. |
| 6,708,172 | B1 | 3/2004 | Wong et al. |
| 6,819,919 | B1 | 11/2004 | Tanaka |

(Continued)

FOREIGN PATENT DOCUMENTS

| EP | 1463354 B1 | 12/2005 |
| WO | 2008/000046 A1 | 1/2008 |

(Continued)

OTHER PUBLICATIONS

Levent Ertoz et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

(Continued)

*Primary Examiner* — Ario Etienne
*Assistant Examiner* — Michael C Lai

(57) ABSTRACT

The present disclosure relates to forming crowds of users taking into account known physical boundaries. In general, current locations of a number of users are obtained. A crowd of users is then formed based on the current locations of the users while taking into account one or more known physical boundaries such that the crowd does not include spatially proximate users on opposite sides of the one or more known physical boundaries. By utilizing known physical boundaries in a spatial crowd formation process, users that are spatially proximate to one another but are separated by a physical boundary are not included in the same crowd. In this manner, the spatial crowd formation process provides accurate and meaningful crowd formation in environments such as, but not limited to, buildings with multiple rooms, shopping malls, or the like.

28 Claims, 23 Drawing Sheets

(56) References Cited

U.S. PATENT DOCUMENTS

| | | | |
|---|---|---|---|
| 6,961,562 B2* | 11/2005 | Ross | 455/425 |
| 6,968,179 B1 | 11/2005 | De Vries | |
| 6,987,885 B2 | 1/2006 | Gonzalez-Banos et al. | |
| 7,116,985 B2 | 10/2006 | Wilson et al. | |
| 7,123,918 B1 | 10/2006 | Goodman | |
| 7,236,739 B2 | 6/2007 | Chang | |
| 7,247,024 B2 | 7/2007 | Bright et al. | |
| 7,272,357 B2 | 9/2007 | Nishiga et al. | |
| 7,398,081 B2 | 7/2008 | Moran | |
| 7,423,580 B2 | 9/2008 | Markhovsky et al. | |
| 7,509,131 B2 | 3/2009 | Krumm et al. | |
| 7,558,404 B2 | 7/2009 | Ma et al. | |
| 7,620,404 B2 | 11/2009 | Chesnais et al. | |
| 7,680,959 B2 | 3/2010 | Svendsen | |
| 7,692,684 B2* | 4/2010 | Ku et al. | 348/169 |
| 7,787,886 B2 | 8/2010 | Markhovsky et al. | |
| 8,010,601 B2 | 8/2011 | Jennings et al. | |
| 8,208,943 B2 | 6/2012 | Petersen et al. | |
| 2001/0013009 A1 | 8/2001 | Greening et al. | |
| 2002/0049690 A1 | 4/2002 | Takano | |
| 2002/0086676 A1 | 7/2002 | Hendrey et al. | |
| 2004/0009750 A1 | 1/2004 | Beros et al. | |
| 2004/0025185 A1 | 2/2004 | Goci et al. | |
| 2004/0192331 A1 | 9/2004 | Gorday et al. | |
| 2005/0038876 A1 | 2/2005 | Chaudhuri | |
| 2005/0070298 A1 | 3/2005 | Caspi et al. | |
| 2005/0174975 A1 | 8/2005 | Mgrdechian et al. | |
| 2005/0176406 A1* | 8/2005 | Krishnakumar et al. | 455/410 |
| 2005/0210387 A1 | 9/2005 | Alagappan et al. | |
| 2005/0231425 A1 | 10/2005 | Coleman et al. | |
| 2006/0161599 A1 | 7/2006 | Rosen | |
| 2006/0166679 A1 | 7/2006 | Karaoguz et al. | |
| 2006/0195361 A1* | 8/2006 | Rosenberg | 705/14 |
| 2006/0256959 A1 | 11/2006 | Hymes | |
| 2006/0270419 A1 | 11/2006 | Crowley et al. | |
| 2007/0005419 A1 | 1/2007 | Horvitz et al. | |
| 2007/0015518 A1 | 1/2007 | Winter et al. | |
| 2007/0030824 A1 | 2/2007 | Ribaudo et al. | |
| 2007/0032242 A1* | 2/2007 | Goodman | 455/453 |
| 2007/0075898 A1 | 4/2007 | Markhovsky et al. | |
| 2007/0135138 A1 | 6/2007 | Brown et al. | |
| 2007/0142065 A1* | 6/2007 | Richey et al. | 455/457 |
| 2007/0167174 A1 | 7/2007 | Halcrow et al. | |
| 2007/0174243 A1 | 7/2007 | Fritz | |
| 2007/0203644 A1 | 8/2007 | Thota et al. | |
| 2007/0218900 A1 | 9/2007 | Abhyanker | |
| 2007/0255785 A1 | 11/2007 | Hayashi et al. | |
| 2007/0282621 A1 | 12/2007 | Altman et al. | |
| 2008/0016018 A1 | 1/2008 | Malik | |
| 2008/0016205 A1 | 1/2008 | Svendsen | |
| 2008/0076418 A1 | 3/2008 | Beyer, Jr. | |
| 2008/0086741 A1 | 4/2008 | Feldman et al. | |
| 2008/0097999 A1 | 4/2008 | Horan | |
| 2008/0106599 A1 | 5/2008 | Liu et al. | |
| 2008/0118106 A1 | 5/2008 | Kilambi et al. | |
| 2008/0140650 A1 | 6/2008 | Stackpole | |
| 2008/0155080 A1 | 6/2008 | Marlow et al. | |
| 2008/0182563 A1 | 7/2008 | Wugofski et al. | |
| 2008/0182591 A1 | 7/2008 | Krikorian | |
| 2008/0188261 A1 | 8/2008 | Arnone | |
| 2008/0222295 A1 | 9/2008 | Robinson et al. | |
| 2008/0227473 A1 | 9/2008 | Haney | |
| 2008/0250312 A1 | 10/2008 | Curtis | |
| 2008/0306826 A1 | 12/2008 | Kramer et al. | |
| 2009/0023410 A1 | 1/2009 | Ghosh | |
| 2009/0024315 A1 | 1/2009 | Scheibe | |
| 2009/0030999 A1 | 1/2009 | Gatzke et al. | |
| 2009/0047972 A1 | 2/2009 | Neeraj | |
| 2009/0076894 A1 | 3/2009 | Bates et al. | |
| 2009/0082038 A1 | 3/2009 | McKiou et al. | |
| 2009/0112467 A1 | 4/2009 | Jiang et al. | |
| 2009/0115570 A1 | 5/2009 | Cusack, Jr. | |
| 2009/0115617 A1 | 5/2009 | Sano et al. | |
| 2009/0132652 A1 | 5/2009 | Athale et al. | |
| 2009/0144211 A1 | 6/2009 | O'Sullivan et al. | |
| 2009/0164431 A1 | 6/2009 | Zivkovic et al. | |
| 2009/0164459 A1 | 6/2009 | Jennings et al. | |
| 2009/0201896 A1 | 8/2009 | Davis et al. | |
| 2009/0287783 A1 | 11/2009 | Beare et al. | |
| 2010/0130226 A1 | 5/2010 | Arrasvuori et al. | |
| 2010/0197318 A1 | 8/2010 | Petersen et al. | |
| 2010/0197319 A1 | 8/2010 | Petersen et al. | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1* | 8/2010 | Petersen et al. | 709/204 |
| 2011/0136506 A1 | 6/2011 | Stewart | |
| 2012/0041983 A1 | 2/2012 | Jennings | |
| 2012/0063427 A1* | 3/2012 | Kandekar et al. | 370/338 |
| 2012/0066138 A1 | 3/2012 | Curtis et al. | |

FOREIGN PATENT DOCUMENTS

| | | |
|---|---|---|
| WO | 2009/039350 A1 | 3/2009 |
| WO | 2009/055501 A1 | 4/2009 |
| WO | 2009/077655 A1 | 6/2009 |

OTHER PUBLICATIONS

Wang Kay Ngai et al., "Efficient Clustering of Uncertain Data," Proceedings of the Sixth International Conference on Data Mining (ICDM'06), Dec. 18-22, 2006; pp. 436-445; copyright 2006 IEEE, 10 pages.

"CitySense—Powered by Sense Networks," http://www.citysense.com/moreinfo.php, copyright 2008 Sense Networks, printed Sep. 8, 2009, 2 pages.

"ConnectingCadence.com—Mapping the social world.," http://replay.web.archive.org/20090331100459/http://www.connectingcadence.com/, copyright 2008 ConnectingCadence, printed Apr. 28, 2011, 1 page.

D. Hardt et al., "OpenID Attribute Exchange 1.0—Final," http://openid.net/specs/openid-attribute-exchange-1_0.html, Dec. 5, 2007, 11 pages.

Dirk Helbing et al., "Self-Organized Pedestrian Crowd Dynamics: Experiments, Simulations, and Design Solutions," Transportation Science, vol. 39, Issue 1, Feb. 2005, http://portal.acm.org/citation.cfm?id=1247227, printed Apr. 28, 2011, 2 pages.

"Fire Eagle," http://fireeagle.yahoo.net, copyright 2007-2011 Yahoo! Inc., printed Apr. 28, 2011, 2 pages.

Nicolas Anciaux et al., "Data Degradation: Making Private Data Less Sensitive Over Time," CIKM 2008, Oct. 26-30, 2008, Napa Valley, California, 2 pages.

"OpenID Foundation website," http://openid.net, copyright 2006-2011 OpenID Foundation, printed Apr. 28, 2011, 2 pages.

"Sense Networks," http://www.sensenetworks.com/about_us.php, copyright 2008-2010 Sense Networks, printed Apr. 28, 2011, 1 page.

"Six degrees of separation," http://en.wikipedia.org/wiki/Six_degrees_of_separation, printed Apr. 28, 2011, 11 pages.

Steve Benford et al., "Crowded Collaborative Virtual Environments," Proceedings of the SIGCHI confernece on Human factors in computing systems, 1997, 8 pages.

"What is LinkedIn?," http://www.linkedin.com/static?key=what_is_linkedin&trk=hb_what, copyright 2011 LinkedIn Corporation, printed Apr. 28, 2011, 1 page.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55-60, 6 pages.

Estrin, M., "Is the MySpace crowd lying to marketers?", Oct. 16, 2007, posted at iMedia Connection, at <http://www.imediaconnec-

(56) References Cited

OTHER PUBLICATIONS tion.com/content/16993.asp>, copyrighted by iMedia Communications, Inc., printed Apr. 28, 2011, 2 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

"MobiClique," copyright 2007-2009, Thomson, originally found at <http://www.thlab.net/~apietila/mobiclique/>, printed Oct. 23, 2009, 5 pages.

Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.

Wu et al., "Crowd Flow Segmentation Using a Novel Region Growing Scheme," in Proceedings PCM 2009, 10th Pacific Rim Conference on Multimedia, Bangkok, Thailand, Dec. 15-18, 2009, pp. 898-907, 10 pages.

\* cited by examiner

CROWD FORMATION BASED ON PHYSICAL BOUNDARIES AND OTHER RULES

RELATED APPLICATIONS

This application claims the benefit of provisional patent application Ser. No. 61/258,838, filed Nov. 6, 2009, the disclosure of which is hereby incorporated herein by reference in its entirety.

FIELD OF THE DISCLOSURE

The present disclosure relates to forming crowds of users.

BACKGROUND

With the proliferation of location-aware mobile devices, crowd tracking and services based thereon are starting to emerge. For example, an exemplary system for forming and tracking crowds of users is described in U.S. patent application Ser. No. 12/645,532 entitled FORMING CROWDS AND PROVIDING ACCESS TO CROWD DATA IN A MOBILE ENVIRONMENT, U.S. patent application Ser. No. 12/645,539 entitled ANONYMOUS CROWD TRACKING, U.S. patent application Ser. No. 12/645,535 entitled MAINTAINING A HISTORICAL RECORD OF ANONYMIZED USER PROFILE DATA BY LOCATION FOR USERS IN A MOBILE ENVIRONMENT, U.S. patent application Ser. No. 12/645,546 entitled CROWD FORMATION FOR MOBILE DEVICE USERS, U.S. patent application Ser. No. 12/645,556 entitled SERVING A REQUEST FOR DATA FROM A HISTORICAL RECORD OF ANONYMIZED USER PROFILE DATA IN A MOBILE ENVIRONMENT, U.S. patent application Ser. No. 12/645,560 entitled HANDLING CROWD REQUESTS FOR LARGE GEOGRAPHIC AREAS, and U.S. patent application Ser. No. 12/645,544 entitled MODIFYING A USER'S CONTRIBUTION TO AN AGGREGATE PROFILE BASED ON TIME BETWEEN LOCATION UPDATES AND EXTERNAL EVENTS, all of which were filed Dec. 23, 2009 and are hereby incorporated herein by reference in their entireties.

One issue with existing crowd formation techniques is that they do not account for tangible physical boundaries, such as walls, that may physically prevent spatially proximate users from being in the same crowd. Similarly, existing crowd formation techniques do not account for intangible physical boundaries, such as boundaries between departments in a department store, that may logically prevent spatially proximate users from being in the same crowd. As such, there is a need for a system and method for forming crowds of users in a manner that takes into account known physical boundaries.

SUMMARY

The present disclosure relates to forming crowds of users taking into account known physical boundaries. In general, current locations of a number of users are obtained. A crowd of users is then formed based on the current locations of the users while taking into account one or more known physical boundaries. Preferably, the one or more physical boundaries are taken into account such that the crowd does not include spatially proximate users that are located on opposite sides of the one or more known physical boundaries. The one or more known physical boundaries preferably include tangible physical boundaries of a Point of Interest (POI). As an example, the POI may be a store within a shopping mall, where the tangible physical boundaries of the store are walls and in some embodiments the floor and ceiling of the store. In addition or alternatively, the one or more known physical boundaries of the POI may include one or more intangible physical boundaries for the POI (e.g., intangible boundaries between departments in a department store). By utilizing known physical boundaries in a spatial crowd formation process, users that are spatially proximate to one another but are separated by a physical boundary are not included in the same crowd. In this manner, the spatial crowd formation process provides accurate and meaningful crowd formation in environments such as, but not limited to, buildings with multiple rooms, shopping malls, or the like.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
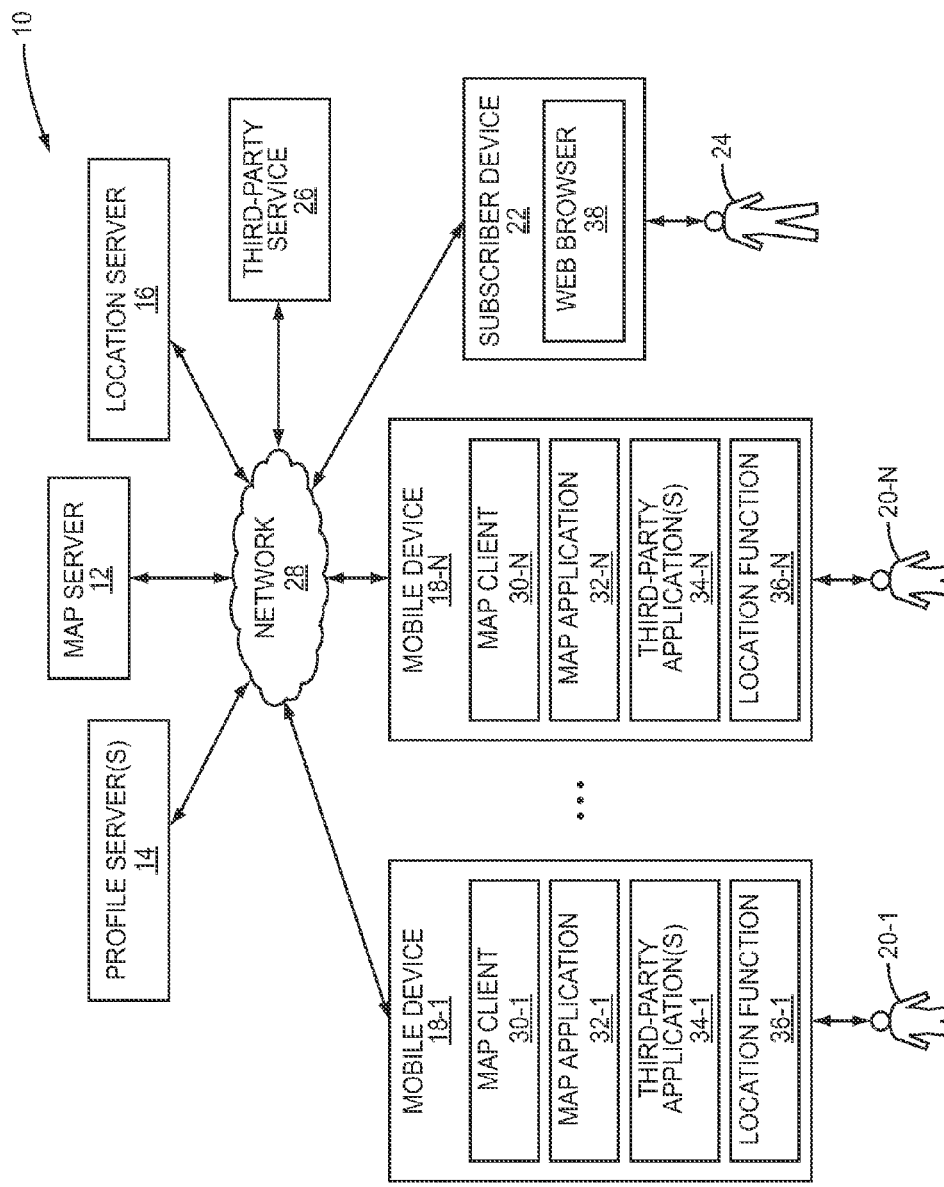
FIG. 1 illustrates a Mobile Aggregate Profile (MAP) system according to one embodiment of the present disclosure.
Figure 13:
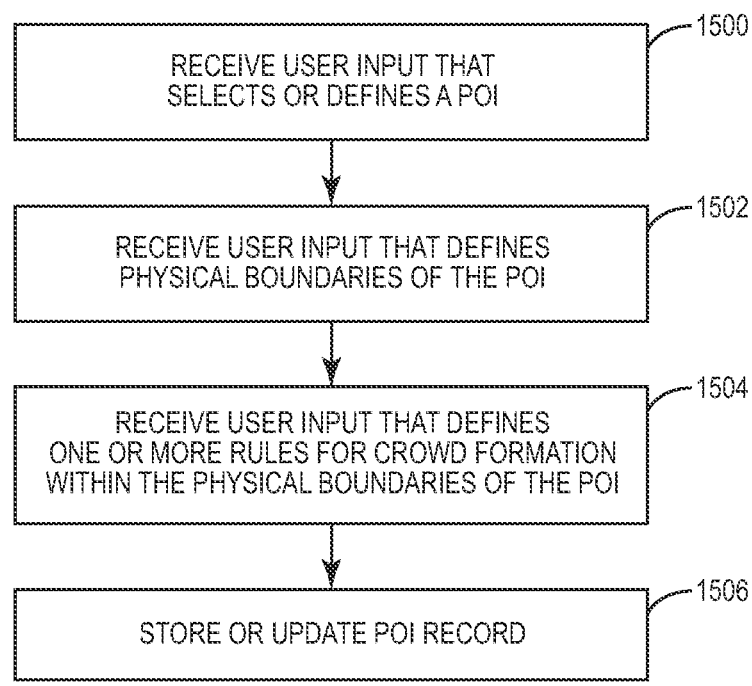
Figure 14:
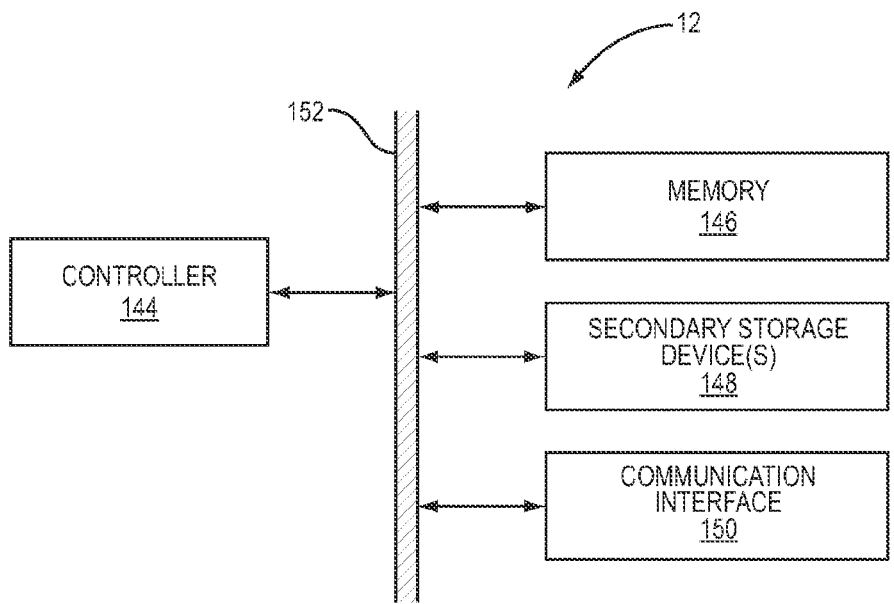
Figure 15:
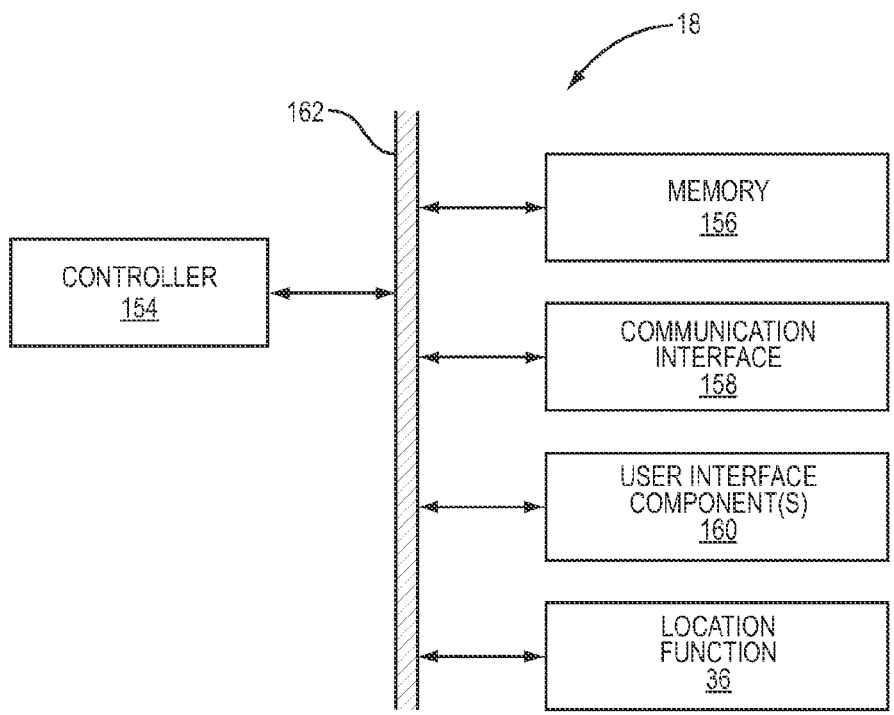

FIGS. 9A through 9E graphically illustrate the crowd formation process of FIGS. 6A through 6D for a scenario where the crowd formation process is triggered by a location update for a user that has no old location and is located within physical boundaries of a Point of Interest (POI);

FIGS. 10A through 10F graphically illustrate the crowd formation process of FIGS. 6A through 6D for a scenario where the crowd formation process is triggered by a location update for a user that has no old location and is not located within physical boundaries of a POI;

FIGS. 11A through 11F graphically illustrate the crowd formation process of FIGS. 6A through 6D for a scenario where the new and old bounding boxes overlap;

FIGS. 12A through 12E graphically illustrate the crowd formation process of FIGS. 6A through 6D in a scenario where the new and old bounding boxes do not overlap;

FIG. 13 illustrates a process in which the MAP server obtains physical boundaries of a POI according to one embodiment of the present disclosure;

FIG. 14 is a block diagram of the MAP server of FIG. 1 according to one embodiment of the present disclosure; and FIG. 15 is a block diagram of one of the mobile devices of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a Mobile Aggregate Profile (MAP) system 10 (hereinafter "system 10") that forms crowds of users taking into account known physical boundaries according to one embodiment of the present disclosure. Note that the system 10 is exemplary and is not intended to limit the scope of the present disclosure. In this embodiment, the system 10 includes a MAP server 12, one or more profile servers 14, a location server 16, a number of mobile devices 18-1 through 18-N (generally referred to herein collectively as mobile devices 18 and individually as mobile device 18) having associated users 20-1 through 20-N (generally referred to herein collectively as users 20 and individually as user 20), a subscriber device 22 having an associated subscriber 24, and a third-party service 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18 are enabled to connect to the network 28 via local wireless connections (e.g., WiFi® or IEEE 802.11 connections) or wireless telecommunications connections (e.g., 3G or 4G telecommunications connections such as GSM, LTE, W-CDMA, or WiMAX® connections).

As discussed below in detail, the MAP server 12 operates to obtain current locations, including location updates, and user profiles of the users 20 of the mobile devices 18. The current locations of the users 20 can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20, the MAP server 12 is enabled to provide a number of features such as, but not limited to, forming crowds of users using current locations and/or user profiles of the users 20, generating aggregate profiles for crowds of users, and tracking crowds. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20 of the mobile devices 18. For example, the one or more profile servers 14 may be servers providing social network services such as the Facebook® social networking service, the MySpace® social networking service, the LinkedIN® social networking service, or the like. As discussed below, using the one or more profile servers 14, the MAP server 12 is enabled to directly or indirectly obtain the user profiles of the users 20 of the mobile devices 18. The location server 16 generally operates to receive location updates from the mobile devices 18 and make the location updates available to entities such as, for instance, the MAP server 12. In one exemplary embodiment, the location server 16 is a server operating to provide Yahoo!'s FireEagle service.

The mobile devices 18 may be mobile smart phones, portable media player devices, mobile gaming devices, or the like. Some exemplary mobile devices that may be programmed or otherwise configured to operate as the mobile devices 18 are the Apple® iPhone, the Palm Pre®, the Samsung Rogue™, the Blackberry Storm™, the Motorola Droid or similar phone running Google's Android™ Operating System, an Apple® iPad, and the Apple® iPod Touch® device. However, this list of exemplary mobile devices is not exhaustive and is not intended to limit the scope of the present disclosure.

The mobile devices 18-1 through 18-N include MAP clients 30-1 through 30-N (generally referred to herein collectively as MAP clients 30 or individually as MAP client 30), MAP applications 32-1 through 32-N (generally referred to herein collectively as MAP applications 32 or individually as MAP application 32), third-party applications 34-1 through 34-N (generally referred to herein collectively as third-party applications 34 or individually as third-party application 34), and location functions 36-1 through 36-N (generally referred to herein collectively as location functions 36 or individually as location function 36), respectively. The MAP client 30 is preferably implemented in software. In general, in the preferred embodiment, the MAP client 30 is a middleware layer operating to interface an application layer (i.e., the MAP application 32 and the third-party applications 34) to the MAP server 12. More specifically, the MAP client 30 enables the MAP application 32 and the third-party applications 34 to request and receive data from the MAP server 12. In addition, the MAP client 30 enables applications, such as the MAP application 32 and the third-party applications 34, to access data from the MAP server 12.

The MAP application 32 is also preferably implemented in software. The MAP application 32 generally provides a user interface component between the user 20 and the MAP server 12. More specifically, among other things, the MAP application 32 enables the user 20 to initiate requests for crowd data or crowd tracking data from the MAP server 12 and presents corresponding data returned by the MAP server 12 to the user 20. The MAP application 32 also enables the user 20 to configure various settings. For example, the MAP application 32 may enable the user 20 to select a desired social networking service (e.g., Facebook®, MySpace®, LinkedIN®, etc.) from which to obtain the user profile of the user 20 and provide any necessary credentials (e.g., username and password) needed to access the user profile from the social networking service.

The third-party applications 34 are preferably implemented in software. The third-party applications 34 operate to access the MAP server 12 via the MAP client 30. The third-party applications 34 may utilize data obtained from the MAP server 12 in any desired manner. As an example, one of the third-party applications 34 may be a gaming application that utilizes crowd data to notify the user 20 of Points of Interest (POIs) or Areas of Interest (AOIs) where crowds of interest are currently located. It should be noted that while the MAP client 30 is illustrated as being separate from the MAP application 32 and the third-party applications 34, the present disclosure is not limited thereto. The functionality of the MAP client 30 may alternatively be incorporated into the MAP application 32 and the third-party applications 34.

The location function 36 may be implemented in hardware, software, or a combination thereof. In general, the location function 36 operates to determine or otherwise obtain the location of the mobile device 18. For example, the location function 36 may be or include a Global Positioning System (GPS) receiver. In addition or alternatively, the location function 36 may include hardware and/or software that enables improved location tracking in indoor environments such as, for example, shopping malls. For example, the location function 36 may be part of or compatible with the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the third-party service 26 is a service that has access to data from the MAP server 12 such as aggregate profiles for one or more crowds at one or more POIs or within one or more AOIs. Based on the data from the MAP server 12, the third-party service 26 operates to provide a service such as, for example, targeted advertising. For example, the third-party service 26 may obtain anonymous aggregate profile data for one or more crowds located at a POI and then provide targeted advertising to known users located at the POI based on the anonymous aggregate profile data. Note that while targeted advertising is mentioned as an exemplary third-party service 26, other types of third-party services 26 may additionally or alternatively be provided. Other types of third-party services 26 that may be provided will be apparent to one of ordinary skill in the art upon reading this disclosure.

Before proceeding, it should be noted that while the system 10 of FIG. 1 illustrates an embodiment where the one or more profile servers 14 and the location server 16 are separate from the MAP server 12, the present disclosure is not limited thereto. In an alternative embodiment, the functionality of the one or more profile servers 14 and/or the location server 16 may be implemented within the MAP server 12.

Figure 2:
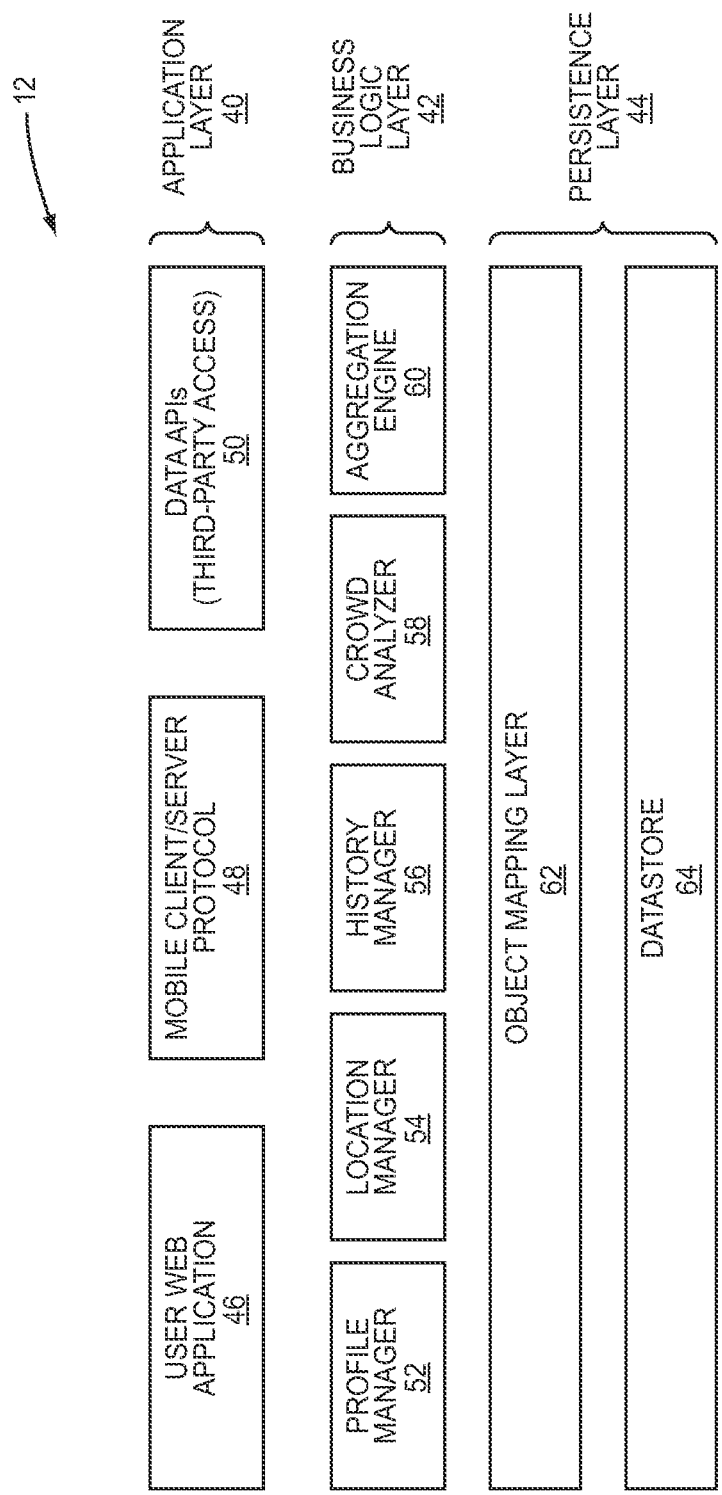
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30 hosted by the mobile devices 18. The data APIs 50 enable third-party services, such as the third-party service 26, to access the MAP server 12.

The business logic layer 42 includes a profile manager 52, a location manager 54, a history manager 56, a crowd analyzer 58, and an aggregation engine 60, each of which is preferably implemented in software. The profile manager 52 generally operates to obtain the user profiles of the users 20 directly or indirectly from the one or more profile servers 14 and store the user profiles in the persistence layer 44. The location manager 54 operates to obtain the current locations of the users 20 including location updates. As discussed below, the current locations of the users 20 may be obtained directly from the mobile devices 18 and/or obtained from the location server 16.

The history manager 56 generally operates to maintain a historical record of anonymized user profile data by location. Note that while the user profile data stored in the historical record is preferably anonymized, it is not limited thereto. The crowd analyzer 58 operates to form crowds of users. In one embodiment, the crowd analyzer 58 utilizes a spatial crowd formation algorithm. However, the present disclosure is not limited thereto. In addition, the crowd analyzer 58 may further characterize crowds to reflect degree of fragmentation, best-case and worst-case degree of separation (DOS), and/or degree of bi-directionality. Still further, the crowd analyzer 58 may also operate to track crowds. The aggregation engine 60 generally operates to provide aggregate profile data in response to requests from the mobile devices 18, the subscriber device 22, and the third-party service 26. The aggregate profile data may be historical aggregate profile data for one or more POIs or one or more AOIs or aggregate profile data for crowd(s) currently at one or more POIs or within one or more AOIs. For additional information regarding the operation of the profile manager 52, the location manager 54, the history manager 56, the crowd analyzer 58, and the aggregation engine 60, the interested reader is directed to U.S. patent application Ser. No. 12/645,532, entitled FORMING CROWDS AND PROVIDING ACCESS TO CROWD DATA IN A MOBILE ENVIRONMENT, which was filed Dec. 23, 2009; U.S. patent application Ser. No. 12/645,539, entitled ANONYMOUS CROWD TRACKING, which was filed Dec. 23, 2009; U.S. patent application Ser. No. 12/645,535, entitled MAINTAINING A HISTORICAL RECORD OF ANONYMIZED USER PROFILE DATA BY LOCATION FOR USERS IN A MOBILE ENVIRONMENT, which was filed Dec. 23, 2009; U.S. patent application Ser. No. 12/645, 546, entitled CROWD FORMATION FOR MOBILE DEVICE USERS, which was filed Dec. 23, 2009; U.S. patent application Ser. No. 12/645,556, entitled SERVING A REQUEST FOR DATA FROM A HISTORICAL RECORD OF ANONYMIZED USER PROFILE DATA IN A MOBILE ENVIRONMENT, which was filed Dec. 23, 2009; U.S. patent application Ser. No. 12/645,560, entitled HANDLING CROWD REQUESTS FOR LARGE GEOGRAPHIC AREAS, which was filed Dec. 23, 2009; and U.S. patent application Ser. No. 12/645,544, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009; all of which have been incorporated herein by reference in their entireties.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal® and Facebook®. The MAP server 12 may then persist RDF descriptions of the users 20 as a proprietary extension of the FOAF vocabulary that includes additional properties desired for the system 10.

Figure 3:
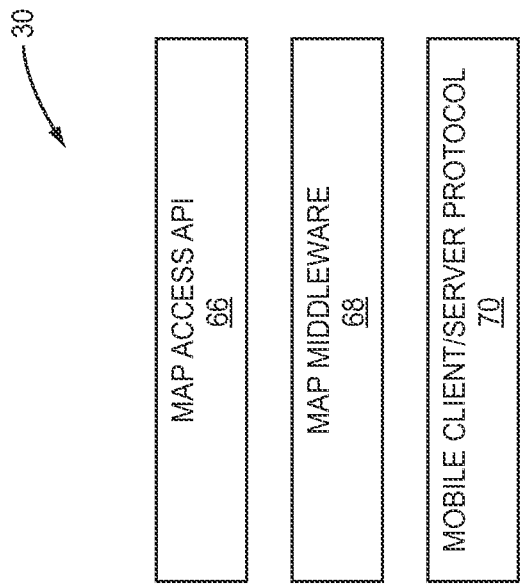
FIG. 3 is a block diagram of the MAP client of one of the mobile devices of FIG. 1 according to one embodiment of the present disclosure.

FIG. 3 illustrates the MAP client 30 of FIG. 1 in more detail according to one embodiment of the present disclosure. As illustrated, in this embodiment, the MAP client 30 includes a MAP access API 66, a MAP middleware component 68, and a mobile client/server protocol component 70. The MAP access API 66 is implemented in software and provides an interface by which the MAP client 30 and the third-party applications 34 are enabled to access the MAP client 30. The MAP middleware component 68 is implemented in software and performs the operations needed for the MAP client 30 to operate as an interface between the MAP application 32 and the third-party applications 34 at the mobile device 18 and the MAP server 12. The mobile client/server protocol component 70 enables communication between the MAP client 30 and the MAP server 12 via a defined protocol.

Figure 4:
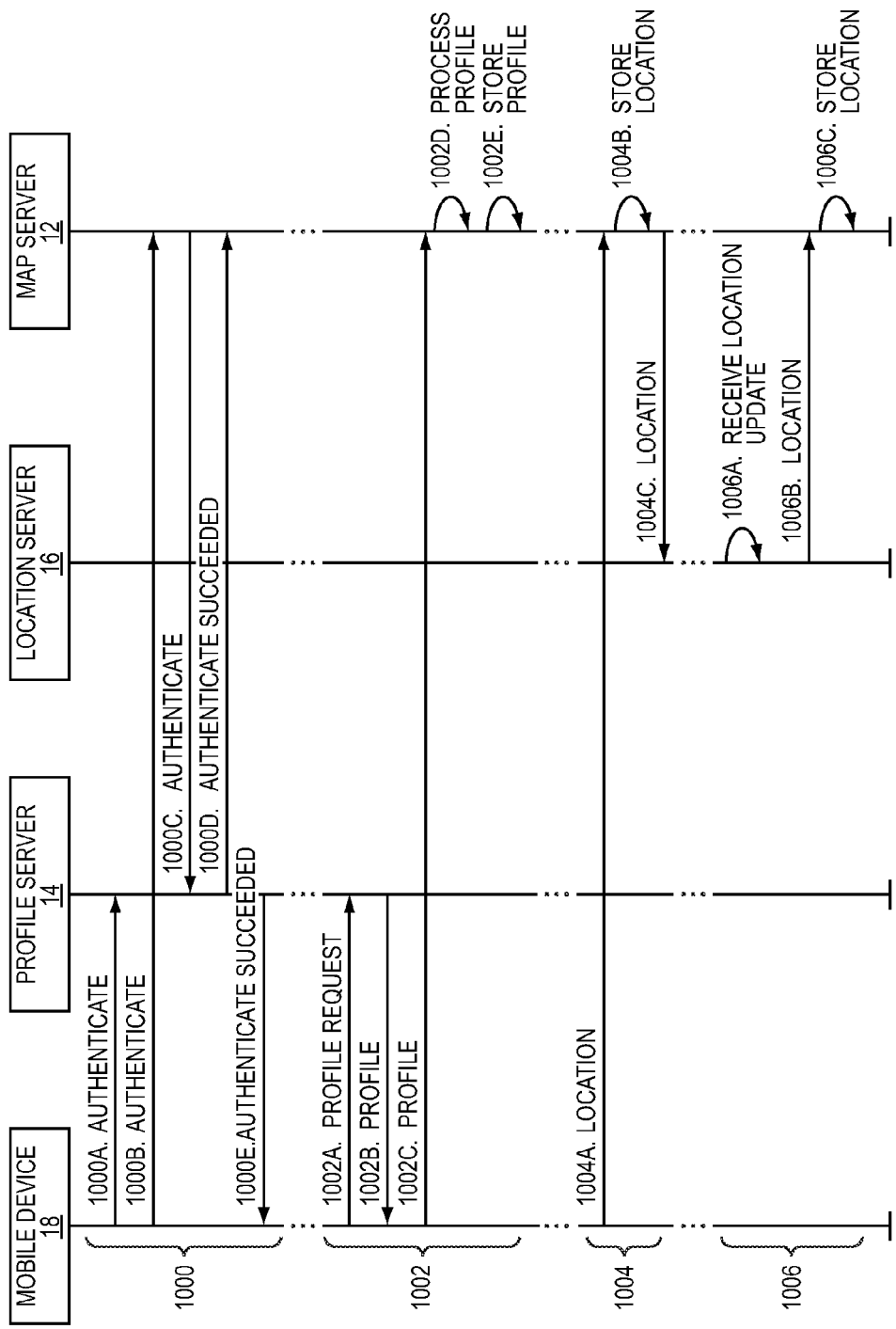
FIG. 4 illustrates the operation of the system of FIG. 1 to provide user profiles and current locations of the users of the mobile devices to the MAP server according to one embodiment of the present disclosure.

While the focus of the present disclosure is crowd formation, before discussing the crowd formation process, a description of an exemplary manner in which the MAP server 12 obtains the user profiles and location updates for the users 20 is beneficial. FIG. 4 illustrates the operation of the system 10 of FIG. 1 to provide the user profile of one of the users 20 of one of the mobile devices 18 to the MAP server 12 according to one embodiment of the present disclosure. This discussion is equally applicable to the other users 20 of the other mobile devices 18. First, an authentication process is performed (step 1000). For authentication, in this embodiment, the mobile device 18 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30 of the mobile device 18 (step 1000E).

At some point after authentication is complete, a user profile process is performed such that a user profile of the user 20 is obtained from the profile server 14 and delivered to the MAP server 12 (step 1002). In this embodiment, the MAP client 30 of the mobile device 18 sends a profile request to the profile server 14 (step 1002A). In response, the profile server 14 returns the user profile of the user 20 to the mobile device 18 (step 1002B). The MAP client 30 of the mobile device 18 then sends the user profile of the user 20 to the MAP server 12 (step 1002C). Note that while in this embodiment the MAP client 30 sends the complete user profile of the user 20 to the MAP server 12, in an alternative embodiment, the MAP client 30 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20 from the MAP client 30 of the mobile device 18, the profile manager 52 of the MAP server 12 processes the user profile (step 1002D). More specifically, in the preferred embodiment, the profile manager 52 includes social network handlers for the social network services supported by the MAP server 12. Thus, for example, if the MAP server 12 supports user profiles from Facebook®, MySpace®, and LinkedIN®, the profile manager 52 may include a Facebook handler, a MySpace handler, and a LinkedIN handler. The social network handlers process user profiles to generate user profiles for the MAP server 12 that include lists of keywords for each of a number of profile categories. The profile categories may be the same for each of the social network handlers or different for each of the social network handlers. Thus, for this example assume that the user profile of the user 20 is from Facebook®. The profile manager 52 uses a Facebook handler to process the user profile of the user 20 to map the user profile of the user 20 from Facebook® to a user profile for the MAP server 12 including lists of keywords for a number of predefined profile categories. For example, for the Facebook handler, the profile categories may be a demographic profile category, a social interaction profile category, a general interests profile category, a music interests profile category, and a movie interests profile category. As such, the user profile of the user 20 from Facebook® may be processed by the Facebook handler of the profile manager 52 to create a list of keywords such as, for example, liberal, High School Graduate, 35-44, College Graduate, etc. for the demographic profile category; a list of keywords such as Seeking Friendship for the social interaction profile category; a list of keywords such as politics, technology, photography, books, etc. for the general interests profile category; a list of keywords including music genres, artist names, album names, or the like for the music interests profile category; and a list of keywords including movie titles, actor or actress names, director names, movie genres, or the like for the movie interests profile category. In one embodiment, the profile manager 52 may use natural language processing or semantic analysis. For example, if the Facebook® user profile of the user 20 states that the user 20 is 20 years old, semantic analysis may result in the keyword of 18-24 years old being stored in the user profile of the user 20 for the MAP server 12.

After processing the user profile of the user 20, the profile manager 52 of the MAP server 12 stores the resulting user profile for the user 20 (step 1002E). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1002 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1004). In this embodiment, the MAP application 32 of the mobile device 18 obtains the current location of the mobile device 18 from the location function 36 of the mobile device 18. The MAP application 32 then provides the current location of the mobile device 18 to the MAP client 30, and the MAP client 30 then provides the current location of the mobile device 18 to the MAP server 12 (step 1004A). Note that step 1004A may be repeated periodically or in response to a change in the current location of the mobile device 18 in order for the MAP application 32 to provide location updates for the user 20 to the MAP server 12.

In response to receiving the current location of the mobile device 18, the location manager 54 of the MAP server 12 stores the current location of the mobile device 18 as the current location of the user 20 (step 1004B). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. As discussed below in detail, historical data maintained by the MAP server 12 is preferably anonymized in order to maintain the privacy of the users 20.

In addition to storing the current location of the user 20, the location manager 54 sends the current location of the user 20 to the location server 16 (step 1004C). In this embodiment, by providing location updates to the location server 16, the MAP server 12 in return receives location updates for the user 20 from the location server 16. This is particularly beneficial when the mobile device 18 does not permit background processes. If the mobile device 18 does not permit background processes, the MAP application 32 will not be able to provide location updates for the user 20 to the MAP server 12 unless the MAP application 32 is active. Therefore, when the MAP application 32 is not active, other applications running on the mobile device 18 (or some other device of the user 20) may directly or indirectly provide location updates to the location server 16 for the user 20. This is illustrated in step 1006 where the location server 16 receives a location update for the user 20 directly or indirectly from another application running on the mobile device 18 or an application running on another device of the user 20 (step 1006A). The location server 16 then provides the location update for the user 20 to the MAP server 12 (step 1006B). In response, the location manager 54 updates and stores the current location of the user 20 in the user record of the user 20 (step 1006C). In this manner, the MAP server 12 is enabled to obtain location updates for the user 20 even when the MAP application 32 is not active at the mobile device 18.

Figure 5:
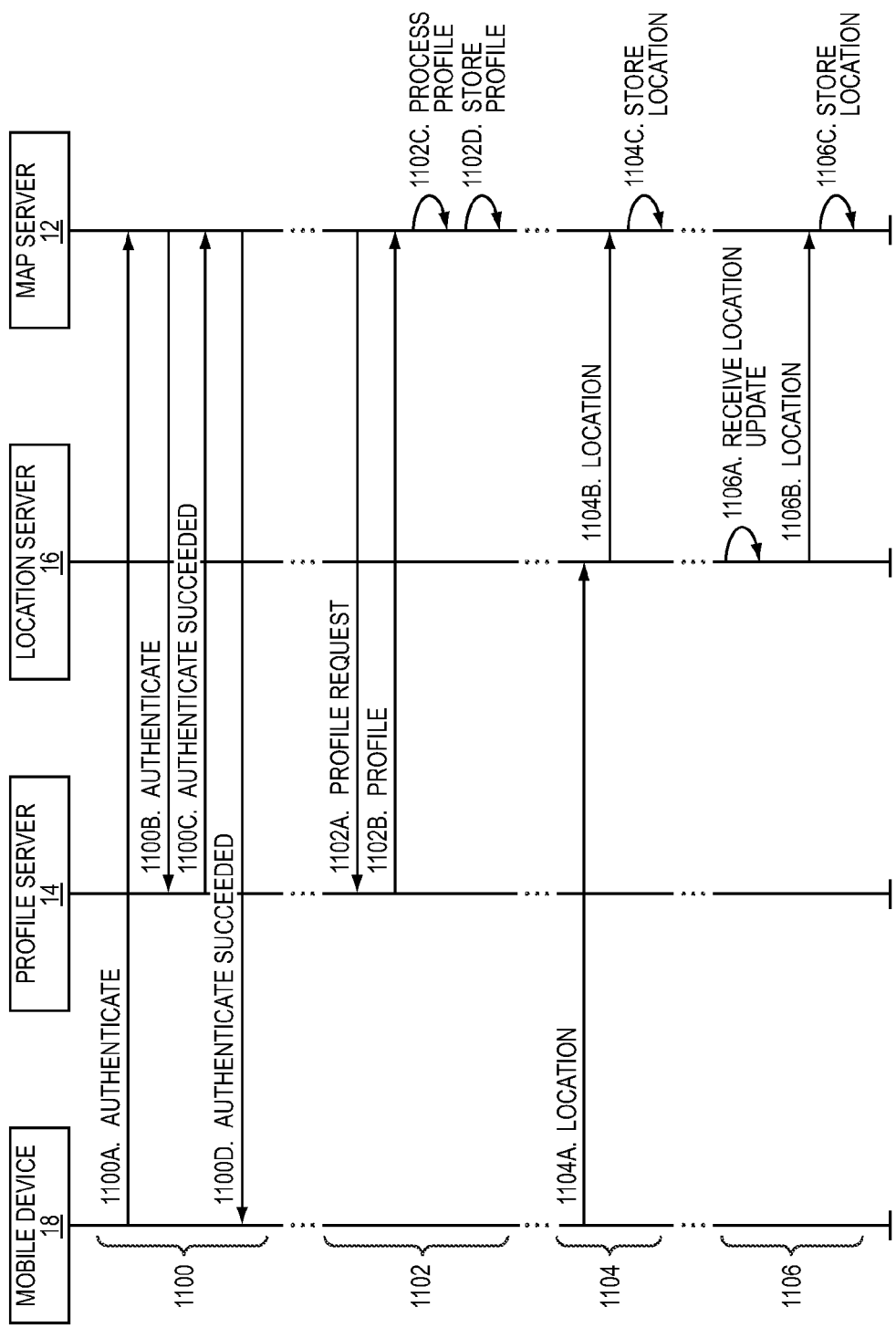
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20 of one of the mobile devices 18 to the MAP server 12 according to another embodiment of the present disclosure. This discussion is equally applicable to user profiles of the users 20 of the other mobile devices 18. First, an authentication process is performed (step 1100). For authentication, in this embodiment, the mobile device 18 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30 of the mobile device 18 (step 1100D).

At some point after authentication is complete, a user profile process is performed such that a user profile of the user 20 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20 to the profile manager 52 of the MAP server 12 (step 1102B). Note that while in this embodiment the profile server 14 returns the complete user profile of the user 20 to the MAP server 12, in an alternative embodiment, the profile server 14 may return a filtered version of the user profile of the user 20 to the MAP server 12. The profile server 14 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20, the profile manager 52 of the MAP server 12 processes the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories. The profile categories may be the same for each of the social network handlers or different for each of the social network handlers.

After processing the user profile of the user 20, the profile manager 52 of the MAP server 12 stores the resulting user profile for the user 20 (step 1102D). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1102 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1104). In this embodiment, the MAP application 32 of the mobile device 18 obtains the current location of the mobile device 18 from the location function 36 of the mobile device 18. The MAP application 32 then provides the current location of the user 20 of the mobile device 18 to the location server 16 (step 1104A). Note that step 1104A may be repeated periodically or in response to changes in the location of the mobile device 18 in order to provide location updates for the user 20 to the MAP server 12. The location server 16 then provides the current location of the user 20 to the MAP server 12 (step 1104B). The location server 16 may provide the current location of the user 20 to the MAP server 12 automatically in response to receiving the current location of the user 20 from the mobile device 18 or in response to a request from the MAP server 12.

In response to receiving the current location of the mobile device 18, the location manager 54 of the MAP server 12 stores the current location of the mobile device 18 as the current location of the user 20 (step 1104C). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. As discussed below in detail, historical data maintained by the MAP server 12 is preferably anonymized in order to maintain the privacy of the users 20.

As discussed above, the use of the location server 16 is particularly beneficial when the mobile device 18 does not permit background processes. As such, if the mobile device 18 does not permit background processes, the MAP application 32 will not provide location updates for the user 20 to the location server 16 unless the MAP application 32 is active. However, other applications running on the mobile device 18 (or some other device of the user 20) may provide location updates to the location server 16 for the user 20 when the MAP application 32 is not active. This is illustrated in step 1106 where the location server 16 receives a location update for the user 20 from another application running on the mobile device 18 or an application running on another device of the user 20 (step 1106A). The location server 16 then provides the location update for the user 20 to the MAP server 12 (step 1106B). In response, the location manager 54 updates and stores the current location of the user 20 in the user record of the user 20 (step 1106C). In this manner, the MAP server 12 is enabled to obtain location updates for the user 20 even when the MAP application 32 is not active at the mobile device 18.

FIGS. 6A through 6D illustrate a spatial crowd formation process in which physical boundaries are taken into account according to one embodiment of the present disclosure. In this embodiment, the spatial crowd formation process is triggered in response to receiving a location update for one of the users 20 and is preferably repeated for each location update received for the users 20. As such, first, the crowd analyzer 58 receives a location update, or a new location, for one of the users 20 (step 1200). In response, the crowd analyzer 58 retrieves an old location of the user 20, if any (step 1202). The old location is the current location of the user 20 prior to receiving the new location.

The crowd analyzer 58 then creates a new bounding region that encompasses the new location taking into account physical boundaries of any relevant POI(s) (step 1204) and an old bounding region that encompasses the old location taking into account physical boundaries of any relevant POI(s) (step 1206). Note that if the user 20 does not have an old location (i.e., the location received in step 1200 is the first location received for the user 20), then the old bounding region is essentially null. As used herein, a physical boundary is either a tangible physical boundary or an intangible physical boundary. A tangible physical boundary is a tangible structure such as, for example, a wall, a fence, or the like. An intangible physical boundary is a conceptual boundary that separates one area from another such as, for example, a boundary between departments in a department store. A POI is relevant to the new location if the new location is within the physical boundaries defined for the POI or the POI is proximate to the new location. Likewise, a POI is relevant to the old location if the old location is within the physical boundaries defined for the POI or the POI is proximate to the old location. Note that while physical boundaries of relevant POIs are referred to in this exemplary embodiment, the present disclosure is not limited to physical boundaries of POIs. In addition or alternatively, other types of physical boundaries that would prevent users on opposite sides of the physical boundaries from being in the same crowd even though the users are spatially proximate to one another or other types of physical boundaries for which it is desirable for users on opposite sides of the physical boundaries to not be considered part of the same crowd can be used for the crowd formation process.

Next, the crowd analyzer 58 determines whether the new and old bounding regions overlap (step 1208). If so, the crowd analyzer 58 combines the new and old bounding regions to provide a combined bounding region (step 1210). The crowd analyzer 58 then determines the individual users and crowds relevant to the combined bounding region created in step 1210 (step 1212). The crowds relevant to the combined bounding region are crowds that are within or overlap the combined bounding region (e.g., have at least one user located within the combined bounding region, have all users located within the combined bounding region, or have crowd centers located within the combined bounding region). The individual users relevant to the combined bounding region are users that are currently located within the combined bounding region and are not already part of a crowd.

Next, the crowd analyzer 58 computes an optimal inclusion distance for individual users based on user density (step 1214). In one embodiment, the optimal inclusion distance for individuals, which is also referred to herein as an initial optimal inclusion distance, is computed based on user density within the combined bounding region. More specifically, the optimal inclusion distance for individuals may be computed according to the following equation:

$$\text{initial\_optimal\_inclusion\_dist} = a \cdot \sqrt{\frac{A_{Bounding\ Region}}{number\_of\_users}},$$

where a is a number between 0 and 1, $A_{BoundingRegion}$ is an area of the combined bounding region, and number_of_users is the total number of users in the combined bounding region. The total number of users in the combined bounding region includes both individual users that are not already in a crowd and users that are already in a crowd. In one embodiment, a is ⅔.

In another embodiment, in addition to having defined physical boundaries, POIs may have one or more rules defined for crowd formation within the physical boundaries defined for the POIs. The rules for each of the POIs may be independently defined and controlled by, for example, an owner or administrative user associated with the POI. The rules may include a minimum user density for crowd formation to be used in lieu of average user density (i.e., number of users within the bounding region divided by the area of the bounding region). In this embodiment, if the combined bounding region is within the physical boundaries of a POI and a minimum user density for crowd formation has been defined for the POI, the initial optimal inclusion distance for individuals may be computed based on the minimum user density defined for the POI. More specifically, the initial optimal inclusion distance may be computed according to the following equation:

$$\text{initial\_optimal\_inclusion\_dist} = a \cdot \sqrt{\frac{1}{DefinedMinimumUserDensity}},$$

where a is a number between 0 and 1 and DefinedMinimumUserDensity is the defined minimum user density for the POI. In one embodiment, a is ⅔. Note that in the situation where the defined minimum user density for the POI is zero, the initial optimal inclusion distance for individuals may be set to a predefined or predetermined maximum value (e.g., a value that is large enough to ensure that all users within the bounding region are determined to be part of the same crowd).

The crowd analyzer 58 then creates a crowd for each individual user within the combined bounding region that is not already included in a crowd and sets the optimal inclusion distance for the crowds to the initial optimal inclusion distance (step 1216). At this point, the process proceeds to FIG. 6B where the crowd analyzer 58 analyzes the crowds relevant to the combined bounding region to determine whether any of the crowd members (i.e., users in the crowds) violate the optimal inclusion distance of their crowds (step 1218). Any crowd member that violates the optimal inclusion distance of his or her crowd is then removed from that crowd (step 1220). The crowd analyzer 58 then creates a crowd of one user for each of the users removed from their crowds in step 1220 and sets the optimal inclusion distance for the newly created crowds to the initial optimal inclusion distance (step 1222).

Next, the crowd analyzer 58 determines the two closest crowds for the bounding region (step 1224) and a distance between the two closest crowds (step 1226). The distance between the two closest crowds is the distance between the crowd centers of the two closest crowds. The crowd analyzer 58 then determines whether the distance between the two closest crowds is less than the optimal inclusion distance of a larger of the two closest crowds (step 1228). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is not less than the optimal inclusion distance, then the process proceeds to step 1238. Otherwise, the two closest crowds are combined or merged (step 1230), and a new crowd center for the resulting crowd is computed (step 1232). Again, a center of mass algorithm may be used to compute the crowd center of a crowd. In addition, a new optimal inclusion distance for the resulting crowd is computed (step 1234). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right),$$

$$\text{optimial\_inclusion\_dist} = \text{average} + \sqrt{\left(\frac{1}{n} \cdot \sum_{i=1}^{n} (d_i - \text{average})^2\right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 1236). The maximum number of iterations is a predefined number that ensures that the crowd formation process does not indefinitely loop over steps 1218 through 1234 or loop over steps 1218 through 1234 more than a desired maximum number of times. If the maximum number of iterations has not been reached, the process returns to step 1218 and is repeated until either the distance between the two closest crowds is not less than the optimal inclusion distance of the larger crowd or the maximum number of iterations has been reached. At that point, the crowd analyzer 58 discards crowds with less than three users, or members (step 1238) and the process ends.

Note that in this example, the minimum number of users needed to form a crowd is three. However, the present disclosure is not limited thereto. The minimum number of users for a crowd may be any number greater than or equal to 2. Further, the minimum number of users for a crowd may be independently defined for each POI having physical boundaries. In this case, if the combined bounding region is within the physical boundaries, then the minimum number of users needed to form a crowd is the minimum number of users for a crowd defined for the POI, if any. Otherwise, the system defined minimum number of users needed for a crowd is used as a default.

Figure 6A:
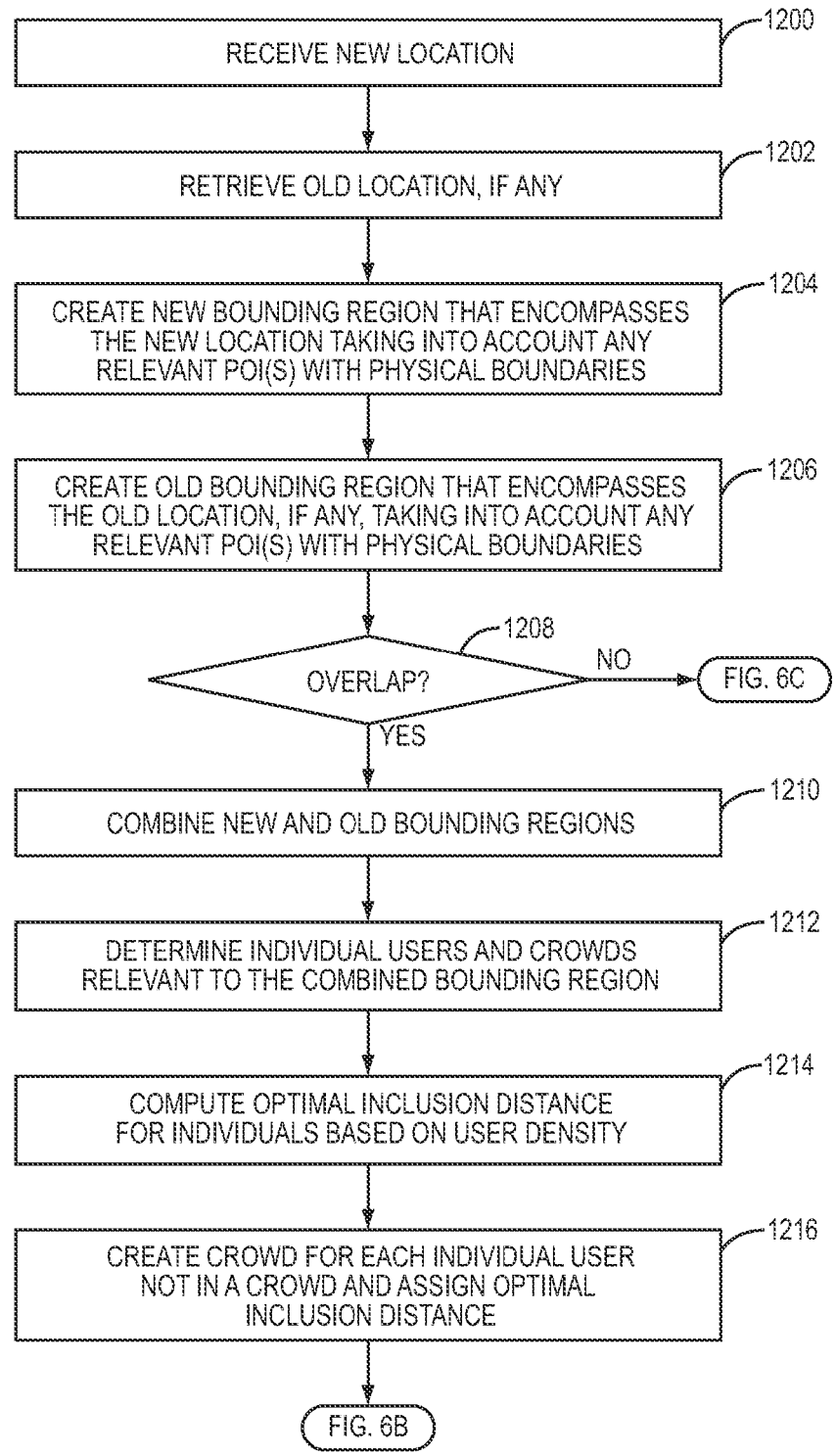
FIGS. 6A through 6D illustrate a crowd formation process that utilizes known physical boundaries according to one embodiment of the present disclosure.
Figure 6B:
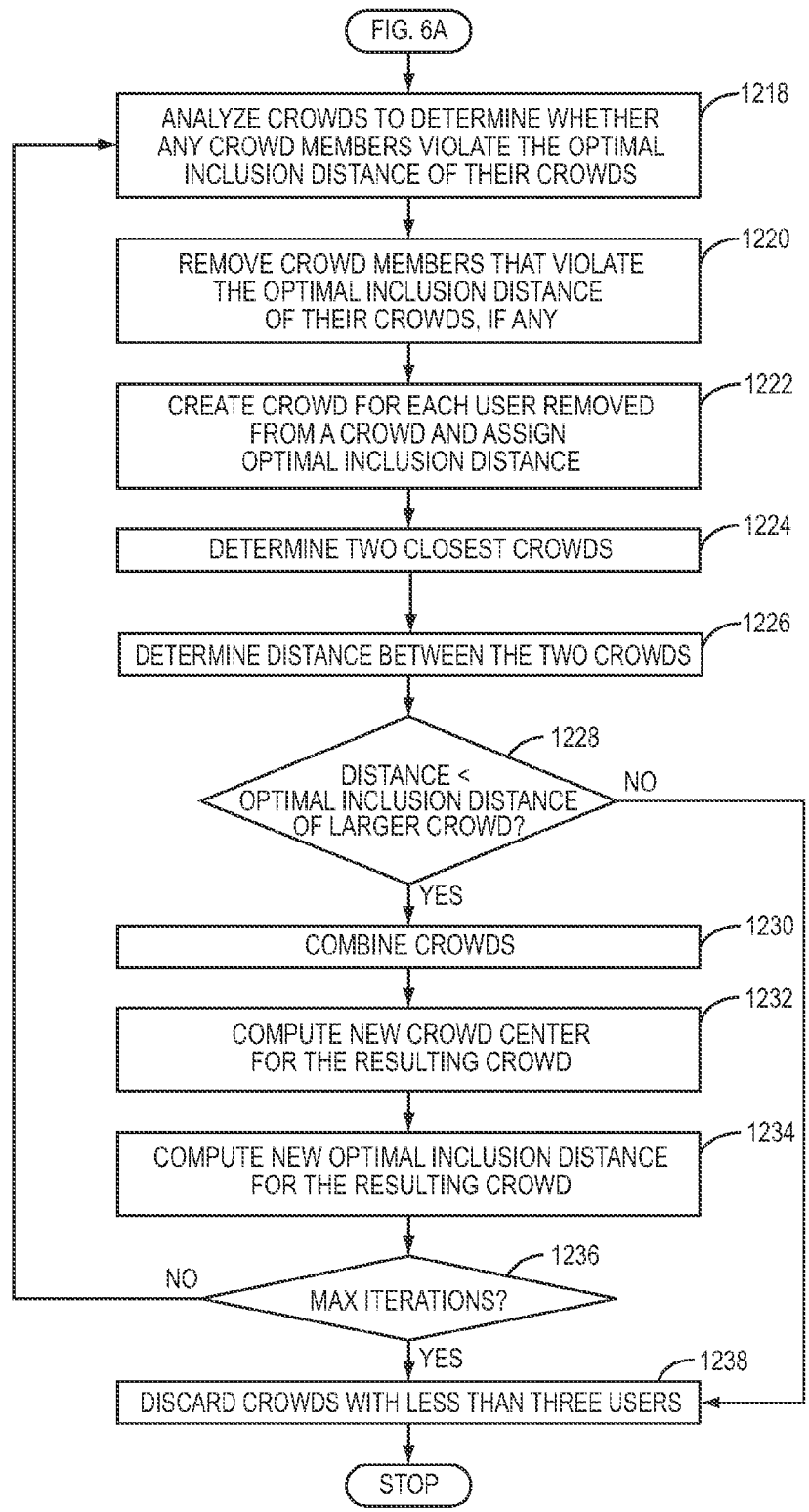
Figure 6C:
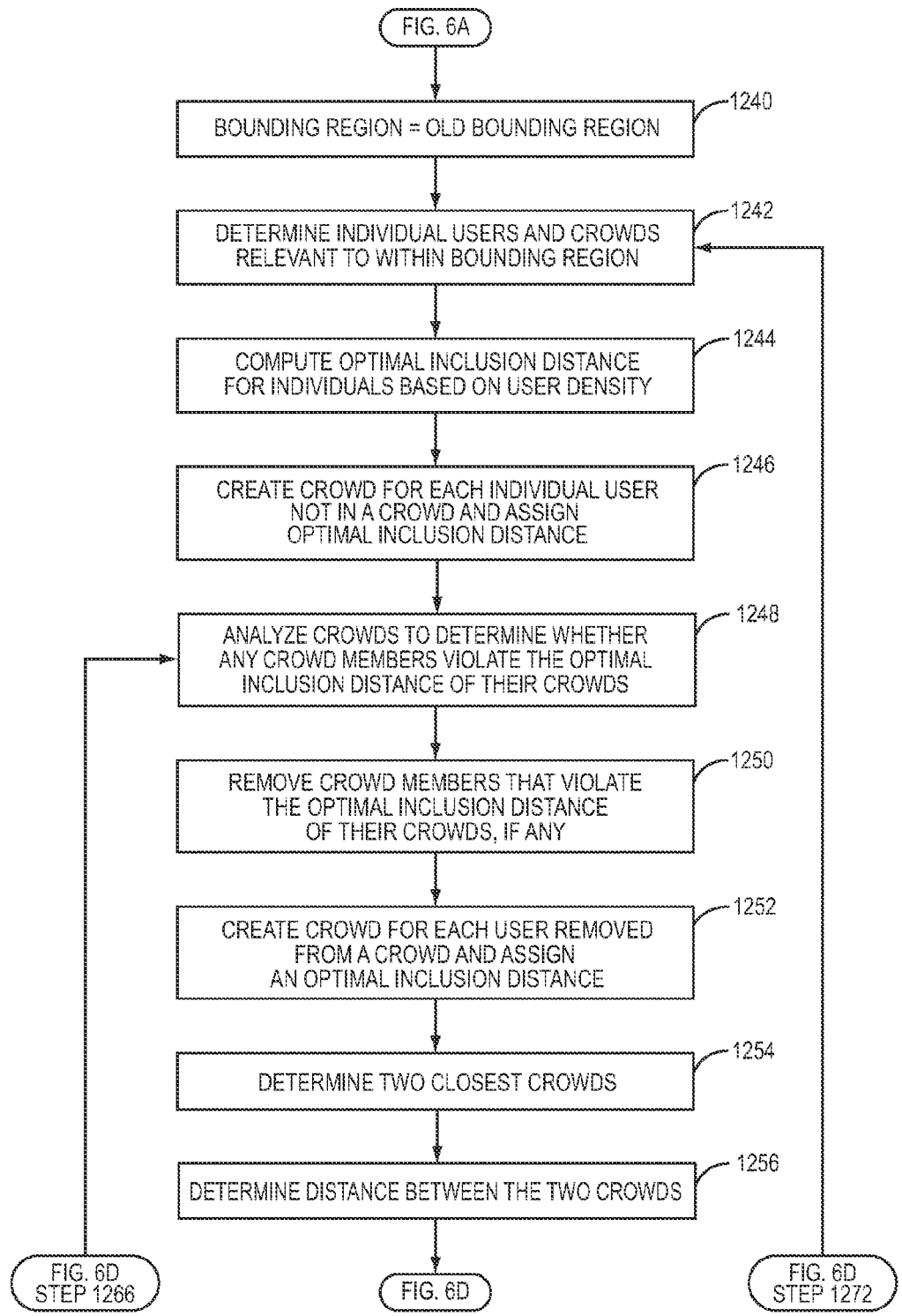
Figure 6D:
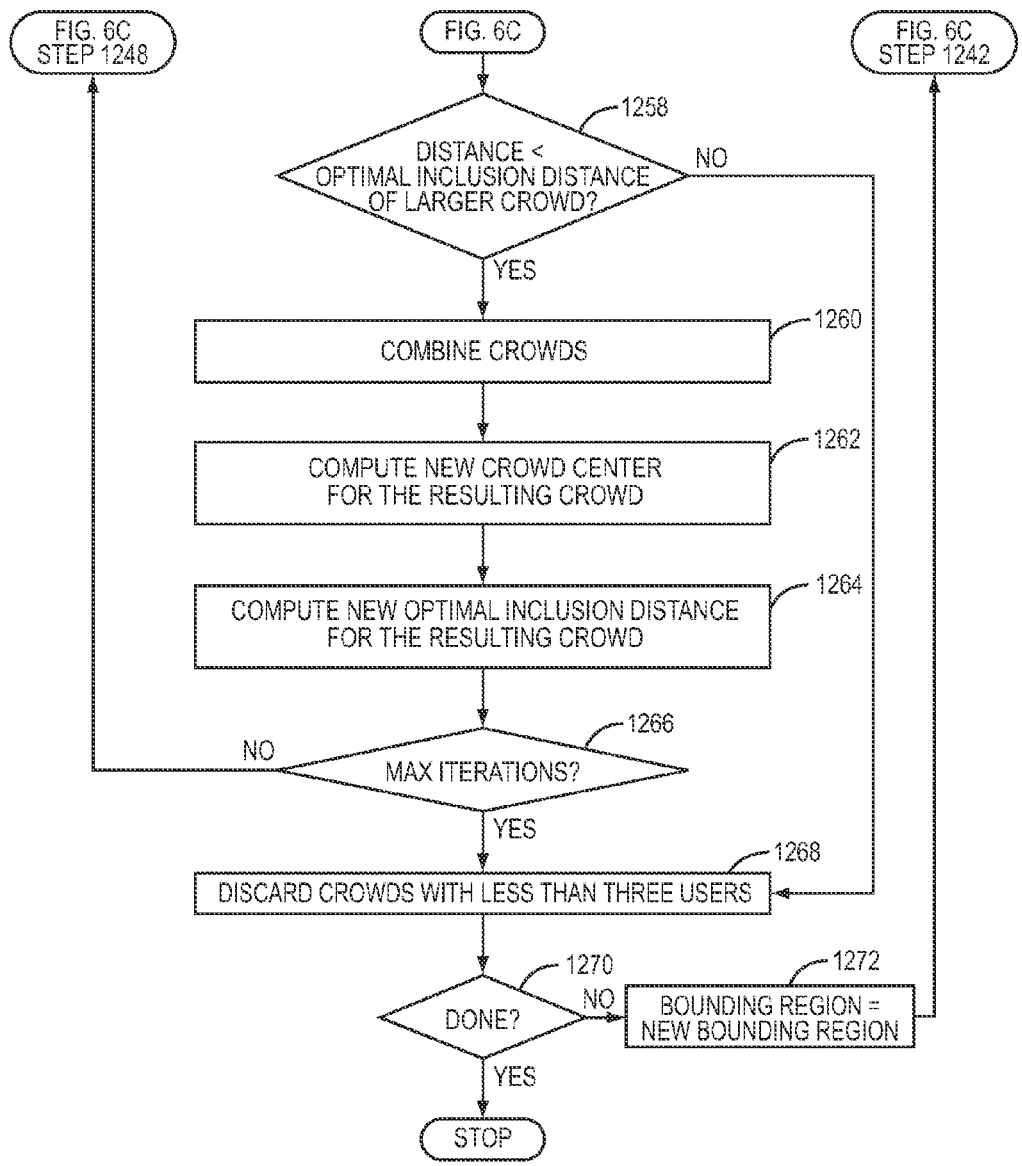

Returning to step 1208 in FIG. 6A, if the new and old bounding regions do not overlap, the process proceeds to FIG. 6C and the bounding region to be processed is set to the old bounding region (step 1240). In general, the crowd analyzer 58 then processes the old bounding region in much the same manner as described above with respect to steps 1212 through

1238. More specifically, the crowd analyzer 58 determines the individual users and crowds relevant to the bounding region (step 1242). Next, the crowd analyzer 58 computes an optimal inclusion distance for individual users based on user density (step 1244). As discussed above, in one embodiment, the optimal inclusion distance for individuals, which is also referred to herein as an initial optimal inclusion distance, is computed based on user density within the combined bounding region. More specifically, the optimal inclusion distance for individuals may be computed according to the following equation:

$$\text{initial\_optimal\_inclusion\_dist} = a \cdot \sqrt{\frac{A_{Bounding\ Region}}{number\_of\_users}},$$

where a is a number between 0 and 1, $A_{BoundingRegion}$ is an area of the bounding region, and number_of_users is the total number of users in the bounding region. The total number of users in the bounding region includes both individual users that are not already in a crowd and users that are already in a crowd. In one embodiment, a is ⅔.

In another embodiment, in addition to having defined physical boundaries, POIs may have one or more rules defined for crowd formation within the physical boundaries defined for the POIs. The rules for each of the POIs may be independently defined and controlled by, for example, an owner or administrative user associated with the POI. The rules may include a minimum user density for crowd formation to be used in lieu of average user density (i.e., number of users within the bounding region divided by the area of the bounding region). In this embodiment, if the bounding region is within the physical boundaries of a POI and a minimum user density for crowd formation has been defined for the POI, the initial optimal inclusion distance for individuals may be computed based on the minimum user density defined for the POI. More specifically, the initial optimal inclusion distance may be computed according to the following equation:

$$\text{initial\_optimal\_inclusion\_dist} = a \cdot \sqrt{\frac{1}{DefinedMinimumUserDensity}},$$

where a is a number between 0 and 1 and DefinedMinimumUserDensity is the defined minimum user density for the POI. In one embodiment, a is ⅔. Note that in the situation where the defined minimum user density for the POI is zero, the initial optimal inclusion distance for individuals may be set to a predefined or predetermined maximum value (e.g., a value that is large enough to ensure that all users within the bounding region are determined to be part of the same crowd).

The crowd analyzer 58 then creates a crowd of one user for each individual user within the bounding region that is not already included in a crowd and sets the optimal inclusion distance for the crowds to the initial optimal inclusion distance (step 1246). At this point, the crowd analyzer 58 analyzes the crowds for the bounding region to determine whether any crowd members (i.e., users in the crowds) violate the optimal inclusion distance of their crowds (step 1248). Any crowd member that violates the optimal inclusion distance of his or her crowd is then removed from that crowd (step 1250). The crowd analyzer 58 then creates a crowd of one user for each of the users removed from their crowds in step 1250 and sets the optimal inclusion distance for the newly created crowds to the initial optimal inclusion distance (step 1252).

Next, the crowd analyzer 58 determines the two closest crowds in the bounding region (step 1254) and a distance between the two closest crowds (step 1256). The distance between the two closest crowds is the distance between the crowd centers of the two closest crowds. The crowd analyzer 58 then determines whether the distance between the two closest crowds is less than the optimal inclusion distance of a larger of the two closest crowds (step 1258). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is not less than the optimal inclusion distance, the process proceeds to step 1268. Otherwise, the two closest crowds are combined or merged (step 1260), and a new crowd center for the resulting crowd is computed (step 1262). Again, a center of mass algorithm may be used to compute the crowd center of a crowd. In addition, a new optimal inclusion distance for the resulting crowd is computed (step 1264). As discussed above, in one embodiment, the new optimal inclusion distance for the resulting crowd is computed as:

$$\text{average} = \frac{1}{n+1} \cdot \left(\text{initial\_optimal\_inclusion\_dist} + \sum_{i=1}^{n} d_i\right),$$

$$\text{optimial\_inclusion\_dist} = \text{average} + \sqrt{\left(\frac{1}{n} \cdot \sum_{i=1}^{n} (d_i - \text{average})^2\right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 1266). If the maximum number of iterations has not been reached, the process returns to step 1248 and is repeated until either the distance between the two closest crowds is not less than the optimal inclusion distance of the larger crowd or the maximum number of iterations has been reached. At that point, the crowd analyzer 58 discards crowds with less than three users, or members (step 1268). Again, note that in this example, the minimum number of users needed to form a crowd is three. However, the present disclosure is not limited thereto. The minimum number of users for a crowd may be any number greater than or equal to 2. Further, the minimum number of users for a crowd may be independently defined for each POI having physical boundaries. In this case, if the combined bounding region is within the physical boundaries, then the minimum number of users needed to form a crowd is the minimum number of users for a crowd defined for the POI, if any. Otherwise, the system defined minimum number of users needed for a crowd is used as a default.

Lastly, the crowd analyzer 58 determines whether the crowd formation process for the new and old bounding regions is done (step 1270). In other words, the crowd analyzer 58 determines whether both the new and old bounding regions have been processed. If not, the bounding region is set to the new bounding region (step 1272), and the process returns to step 1242 and is repeated for the new bounding region. Once both the new and old bounding regions have been processed, the crowd formation process ends.

Figure 7:
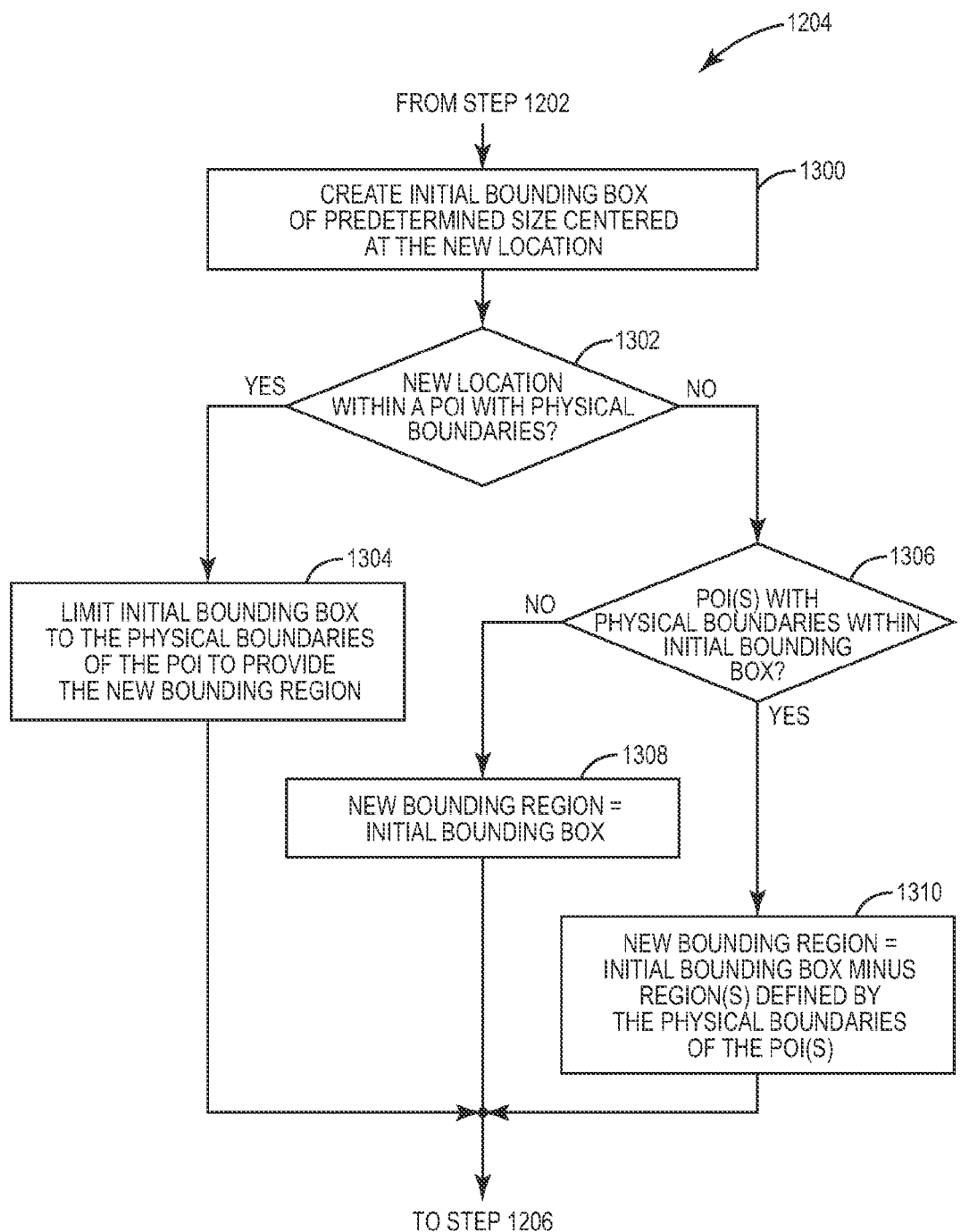
FIG. 7 illustrates the step of creating the new bounding region for the new location of the user in FIG. 6A in more detail according to one embodiment of the present disclosure.

FIG. 7 is a more detailed illustration of step 1204 of FIG. 6A according to one embodiment of the present disclosure. In order to create the new bounding region for the new location of the user 20 in step 1204 of FIG. 6A, the crowd analyzer 58 first creates an initial bounding box of a predetermined size centered at, or otherwise encompassing, the new location of the user 20 (step 1300). Note that while an initial bounding "box" is used in this example, the present disclosure is not limited thereto. The initial bounding region may be of any desired shape. In one exemplary embodiment, an initial bounding box is a 40 meter (m) by 40 m geographic region.

Next, the crowd analyzer 58 determines whether the new location is within the physical boundaries of a POI (step 1302). If so, the crowd analyzer 58 limits the initial bounding box to the physical boundaries of the POI to provide the new bounding region (step 1304). In this manner, only users and existing crowds that are located within the physical boundaries of the same POI will be considered for the crowd formation process with respect to the new bounding region. As a result, users located on opposite sides of the physical boundaries of the POI will not be included in the same crowd even if the users are otherwise sufficiently close to one another to be in the same crowd.

More specifically, in one embodiment, the physical boundaries of a POI may define a perimeter of the POI in 2-Dimensional (2D) space. For example, the physical boundaries of a box-shaped POI may be defined by a latitude and longitude pair defining a north-west corner of the box-shaped POI and a latitude and longitude pair defining a south-east corner of the box-shaped POI. In this case, the initial bounding box would be limited by the physical boundaries of the box-shaped POI. In another embodiment, the physical boundaries may define a perimeter of the POI in 3-Dimensional (3D) space. For example, the physical boundaries of a box-shaped POI may be defined by a latitude and longitude pair defining a north-west corner of the box-shaped POI, a latitude and longitude pair defining a south-east corner of the box-shaped POI, an altitude of a floor of the box-shaped POI, and an altitude of a ceiling of the box-shaped POI. Three-dimensional physical boundaries of a POI may be desired, for example, for POIs located in a multi-level building such as, for example, a multi-level shopping mall. In the case of 3D physical boundaries, the initial bounding box is limited to the 3D physical boundaries of the POI.

Returning to step 1302, if the new location of the user 20 is not within the physical boundaries of a POI, the crowd analyzer 58 then determines whether there are any POI(s) with defined physical boundaries located within or overlapping the initial bounding box (step 1306). If not, the new bounding region is set equal to the initial bounding box created in step 1300 (step 1308). Otherwise, the new bounding region is set equal to the initial bounding box created in step 1300 minus region(s) defined by the physical boundaries of the POI(s) located within or otherwise overlapping the initial bounding box (step 1310). In this manner, if the new location of the user 20 is outside of known physical boundaries of the POIs, then the crowd formation process does not take into account users and existing crowds that are located within the physical boundaries of nearby POIs. As a result, users located inside the physical boundaries of nearby POIs cannot be included in crowds outside the physical boundaries of the POIs even if the users would otherwise be located sufficiently close to one another to be included in the same crowd.

Figure 8:
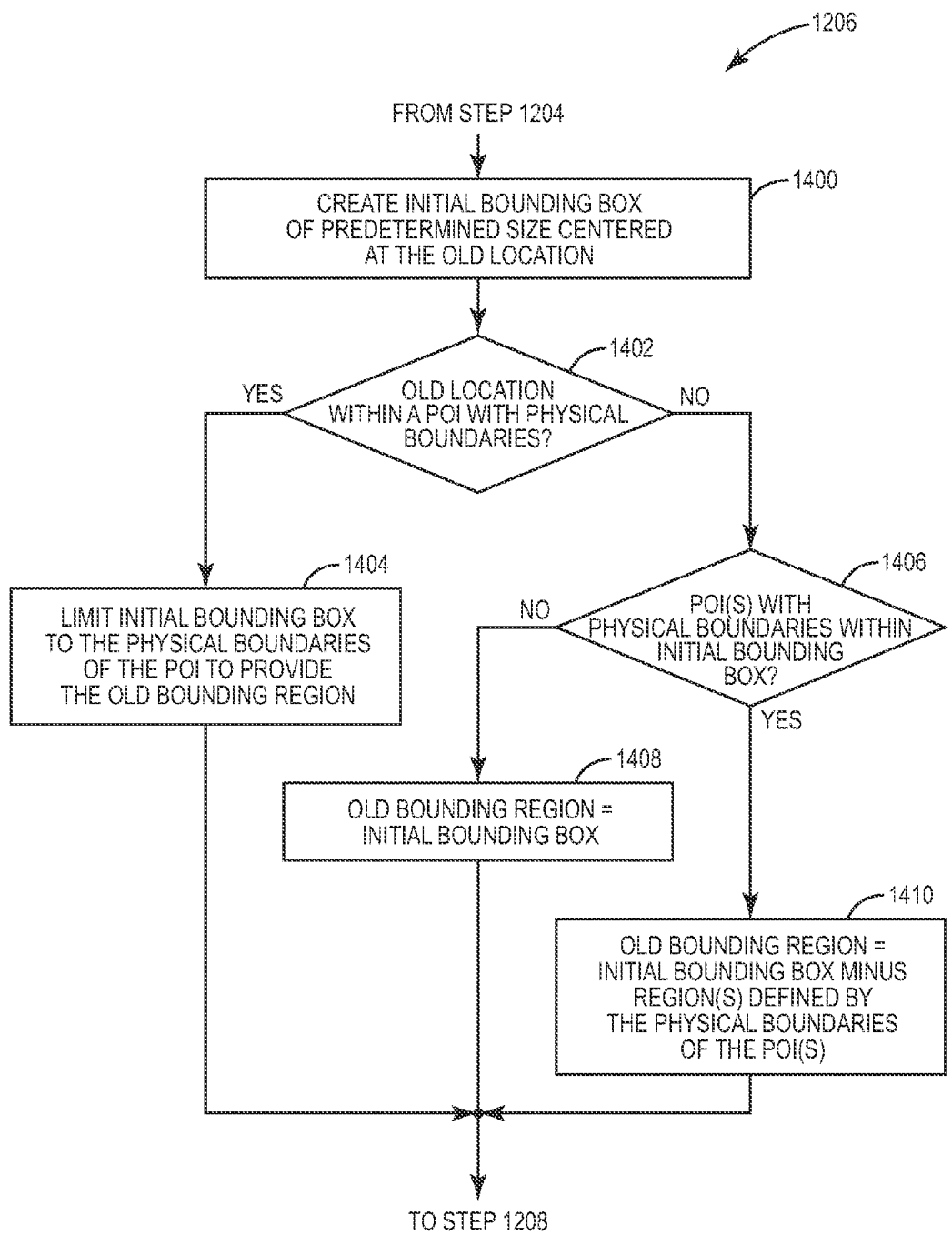
FIG. 8 illustrates the step of creating the old bounding region for the old location of the user in FIG. 6A in more detail according to one embodiment of the present disclosure.

FIG. 8 is a more detailed illustration of step 1206 of FIG. 6A according to one embodiment of the present disclosure. In order to create the old bounding region for the old location of the user 20 in step 1206 of FIG. 6A, the crowd analyzer 58 first creates an initial bounding box of a predetermined size centered at, or otherwise encompassing, the old location of the user 20 (step 1400). Note that while an initial bounding "box" is used in this example, the present disclosure is not limited thereto. The initial bounding region may be of any desired shape. In one exemplary embodiment, an initial bounding box is a 40 m by 40 m geographic region.

Next, the crowd analyzer 58 determines whether the old location is within the physical boundaries of a POI (step 1402). If so, the crowd analyzer 58 limits the initial bounding box to the physical boundaries of the POI to provide the old bounding region (step 1404). In this manner, only users and existing crowds that are located within the physical boundaries of the same POI will be considered for the crowd formation process with respect to the old bounding region. As a result, users located on opposite sides of the physical boundaries of the POI will not be included in the same crowd even if the users are otherwise sufficiently close to one another to be in the same crowd.

Returning to step 1402, if the old location of the user 20 is not within the physical boundaries of a POI, the crowd analyzer 58 then determines whether there are any POI(s) with defined physical boundaries located within or overlapping the initial bounding box (step 1406). If not, the old bounding region is set equal to the initial bounding box created in step 1400 (step 1408). Otherwise, the old bounding region is set equal to the initial bounding box created in step 1400 minus region(s) defined by the physical boundaries of the POI(s) located within or otherwise overlapping the initial bounding box (step 1410). In this manner, if the old location of the user 20 is outside of known physical boundaries of the POIs, then the crowd formation process does not take into account users and existing crowds that are located within the physical boundaries of nearby POIs. As a result, users located inside the physical boundaries of nearby POIs cannot be included in crowds outside the physical boundaries of the POIs even if the users would otherwise be located sufficiently close to one another to be included in the same crowd.

Figure 9A:
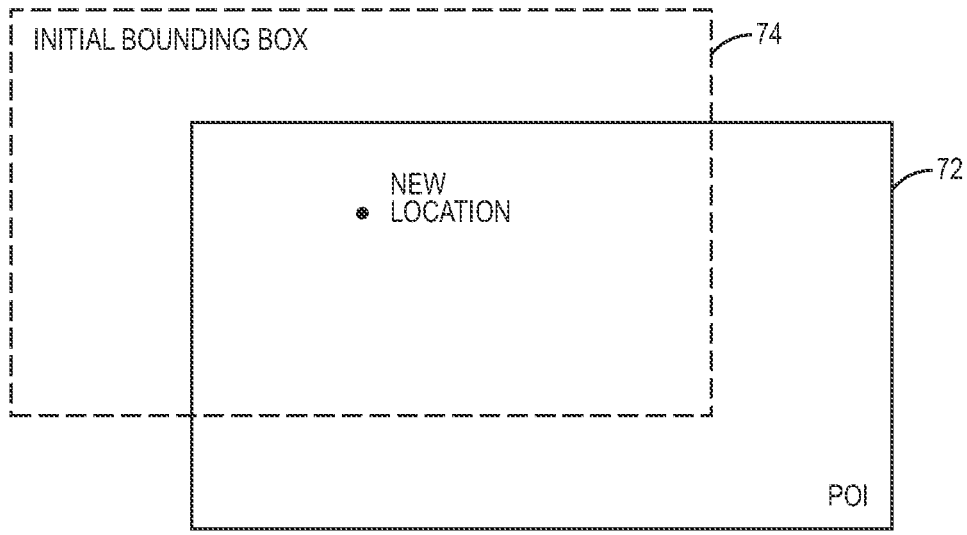
Figure 9B:
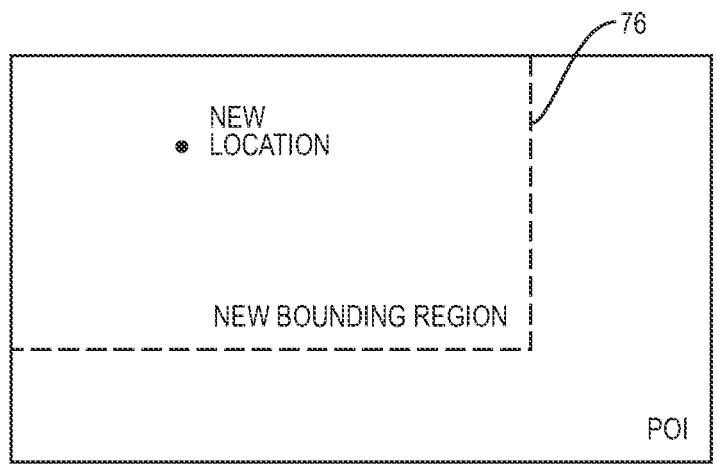

FIGS. 9A through 9E graphically illustrate the process of FIGS. 6A through 6D according to one exemplary embodiment of the present disclosure. In this example, the user does not have an old location, and the new location of the user is located within physical boundaries 72 of a POI, as illustrated in FIG. 9A. In order to create the new bounding region for the crowd formation process according to step 1204, an initial bounding box 74 is created, as also illustrated in FIG. 9A. In this embodiment, the initial bounding box 74 is centered at the new location of the user. As discussed above with respect to FIG. 7, since the new location of the user is within the physical boundaries 72 of the POI, a new bounding region 76 is created by limiting the initial bounding box 74 to the physical boundaries 72 of the POI, as illustrated in FIG. 9B.

Figure 9C:
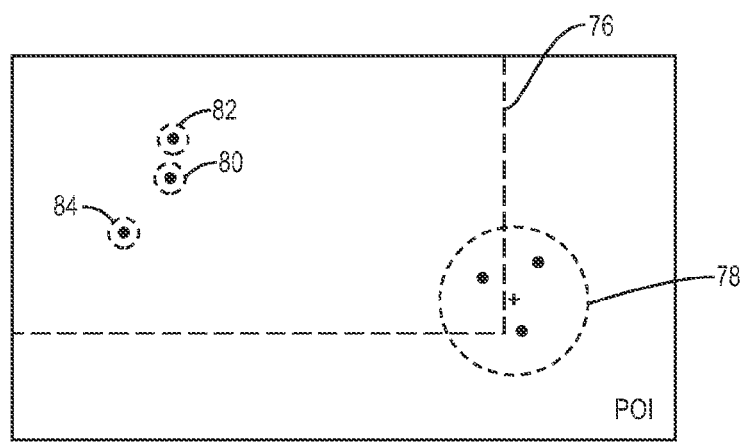

Once the new bounding region 76 is created, the crowd formation process proceeds as outlined above. Specifically, the crowd analyzer 58 identifies all individual users currently located within the new bounding region 76 and all crowds located within or overlapping the new bounding region 76, as illustrated in FIG. 9C. In this example, crowd 78 is an existing crowd relevant to the new bounding region 76. Crowds are indicated by dashed circles, crowd centers are indicated by cross-hairs (+), and users are indicated as dots. Next, as also illustrated in FIG. 9C, the crowd analyzer 58 creates crowds 80 through 84 of one user for the individual users, and the optimal inclusion distances of the crowds 80 through 84 are set to the initial optimal inclusion distance.

Figure 9D:
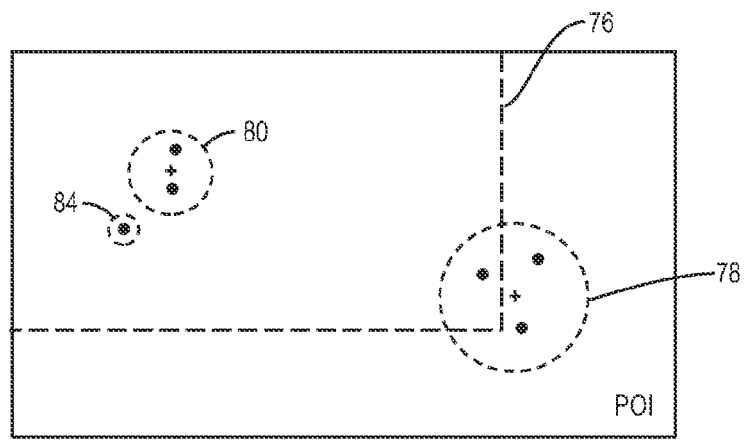
Figure 9E:
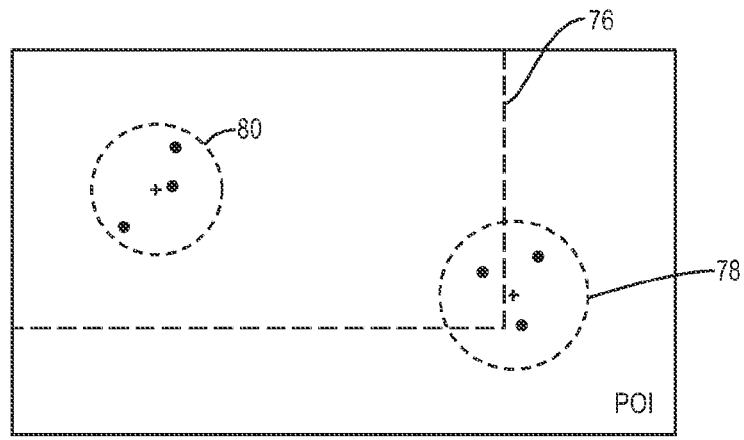

The crowd analyzer 58 then identifies the two closest crowds 80 and 82 in the new bounding region 76 and determines a distance between the two closest crowds 80 and 82. In this example, the distance between the two closest crowds 80 and 82 is less than the optimal inclusion distance. As such, the two closest crowds 80 and 82 are merged and a new crowd center and new optimal inclusion distance are computed, as illustrated in FIG. 9D. The crowd analyzer 58 then repeats the process such that the two closest crowds 80 and 84 in the new bounding region 76 are again merged, as illustrated in FIG. 9E. At this point, the distance between the two closest crowds 78 and 80 is greater than the appropriate optimal inclusion distance. As such, the crowd formation process is complete.

Figure 10A:
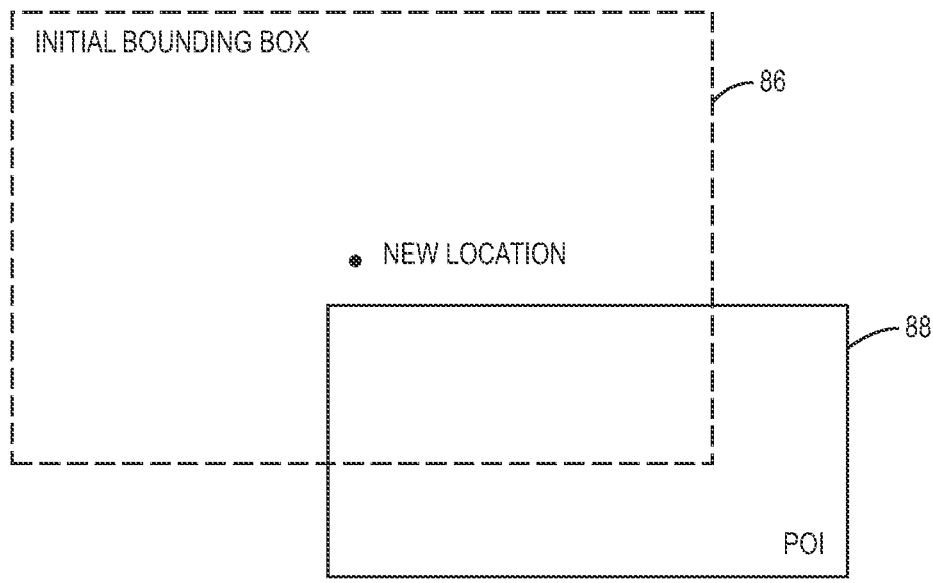
Figure 10B:
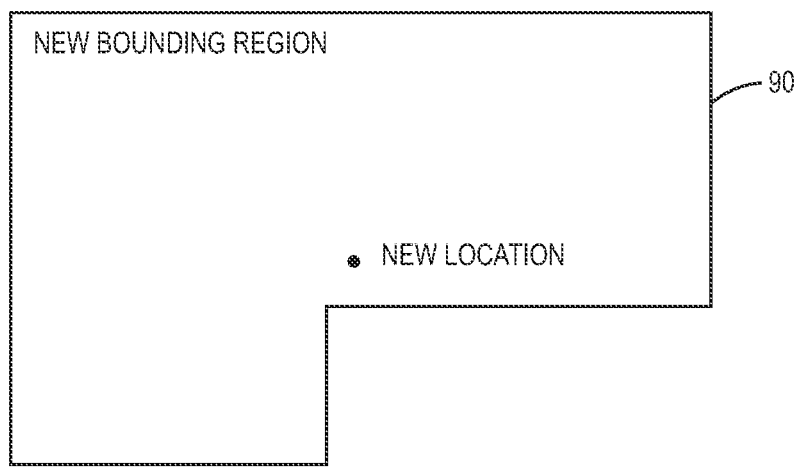

FIGS. 10A through 10F graphically illustrate the process of FIGS. 6A through 6D according to another exemplary embodiment of the present disclosure. In this example, the user 20 does not have an old location, and the new location of the user 20 is located outside any known physical boundaries of all known POIs, as illustrated in FIG. 10A. In order to create the new bounding region for the crowd formation process according to step 1204, an initial bounding box 86 is created, as also illustrated in FIG. 10A. The initial bounding box 86 is centered at the new location of the user 20. As discussed above with respect to FIG. 7, since the new location of the user 20 is not within known physical boundaries of any POI, the crowd analyzer 58 determines whether there are any POIs having known physical boundaries that are proximate to the new location of the user 20. Specifically, in this embodiment, the crowd analyzer 58 determines whether there are any POIs having known physical boundaries that are within or otherwise overlap the initial bounding box 86. In this example, a POI having physical boundaries 88 is identified as being relevant to the initial bounding box 86 because the physical boundaries 88 of the POI overlap the initial bounding box 86. As such, the region within the physical boundaries 88 of the POI are excluded from the initial bounding box 86 to provide a new bounding region 90, as illustrated in FIG. 10B.

Figure 10C:
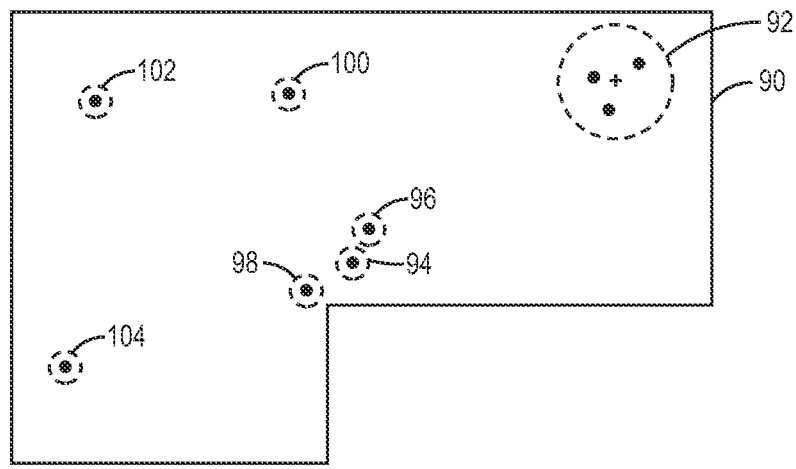

Once the new bounding region 90 is created, the crowd formation process proceeds as outlined above. Specifically, the crowd analyzer 58 identifies all individual users currently located within the new bounding region 90 and all crowds located within or overlapping the new bounding region 90, as illustrated in FIG. 10C. In this example, crowd 92 is an existing crowd relevant to the new bounding region 90. Crowds are indicated by dashed circles, crowd centers are indicated by cross-hairs (+), and users are indicated as dots. Next, as also illustrated in FIG. 10C, the crowd analyzer 58 creates crowds 94 through 104 of one user for the individual users, and the optimal inclusion distances of the crowds 94 through 104 are set to the initial optimal inclusion distance.

Figure 10D:
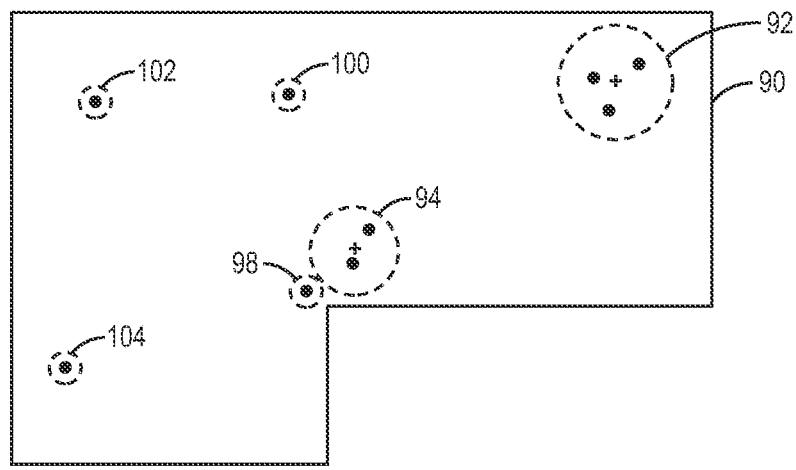
Figure 10E:
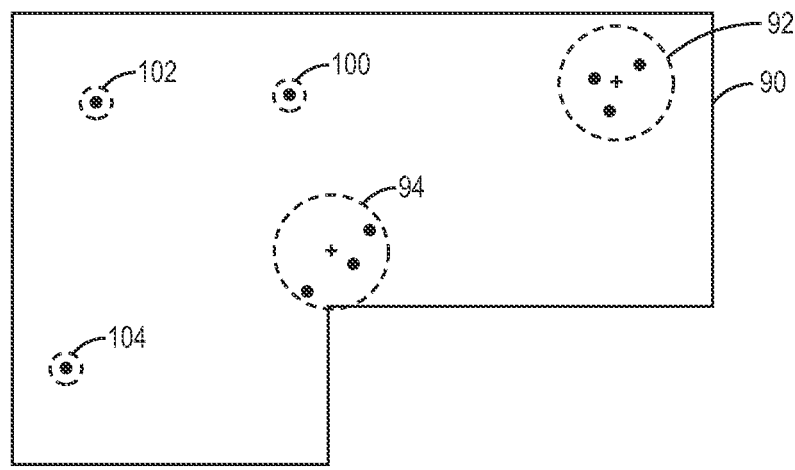
Figure 10F:
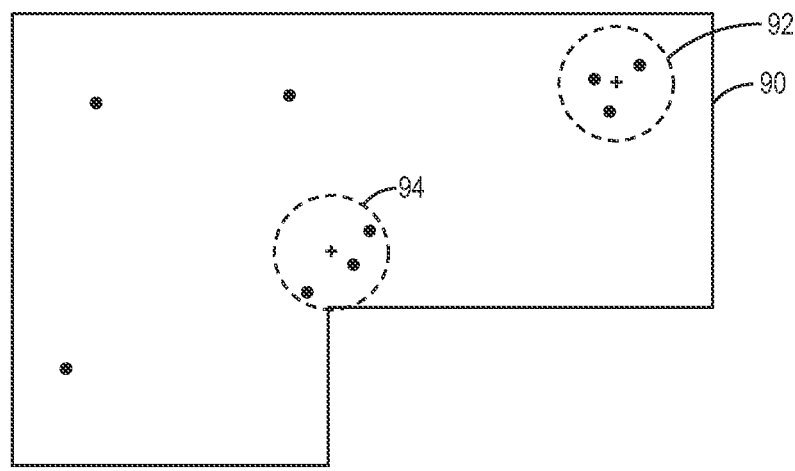

The crowd analyzer 58 then identifies the two closest crowds 94 and 96 in the new bounding region 90 and determines a distance between the two closest crowds 94 and 96. In this example, the distance between the two closest crowds 94 and 96 is less than the optimal inclusion distance. As such, the two closest crowds 94 and 96 are merged and a new crowd center and new optimal inclusion distance are computed, as illustrated in FIG. 10D. The crowd analyzer 58 then repeats the process such that the two closest crowds 94 and 98 in the new bounding region 90 are again merged, as illustrated in FIG. 10E. At this point, the distance between the two closest crowds 94 and 100 is greater than the appropriate optimal inclusion distance. As such, crowds having less than the minimum number of users for a crowd are discarded, and the crowd formation process is then complete. In this example, the minimum number of users for a crowd is 3. As such, the crowds 100 through 104 are discarded as illustrated in FIG. 10F.

Figure 11A:
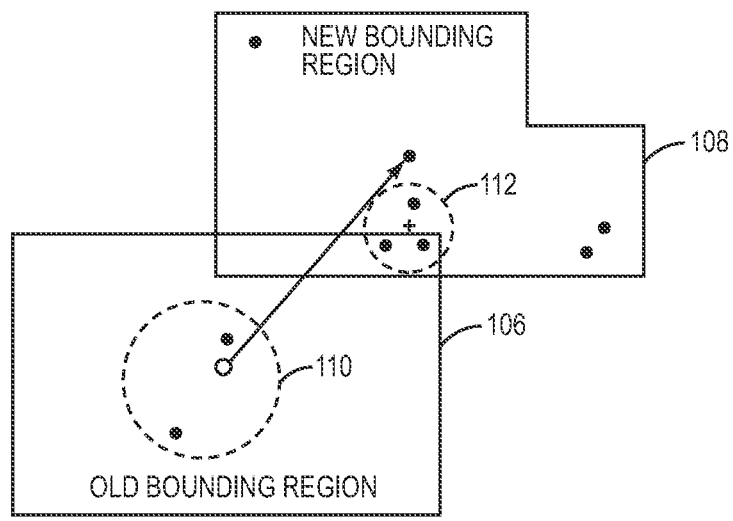

FIGS. 11A through 11F graphically illustrate the crowd formation process of FIGS. 6A through 6D for a scenario where the new and old bounding regions determined in steps 1204 and 1206 of FIG. 6A overlap. As illustrated in FIG. 11A, a user moves from an old location to a new location, as indicated by an arrow. The crowd analyzer 58 receives a location update for the user giving the new location of the user. In response, the crowd analyzer 58 creates an old bounding region 106 for the old location of the user and a new bounding region 108 for the new location of the user. Notably, in this example, a region within the physical boundaries of a POI at the north-east corner of the new bounding region 108 has been excluded from the new bounding region 108 since the new location of the user is outside the physical boundaries of that POI. In this example, a crowd 110 exists in the old bounding region 106, and crowd 112 exists in the new bounding region 108.

Figure 11B:
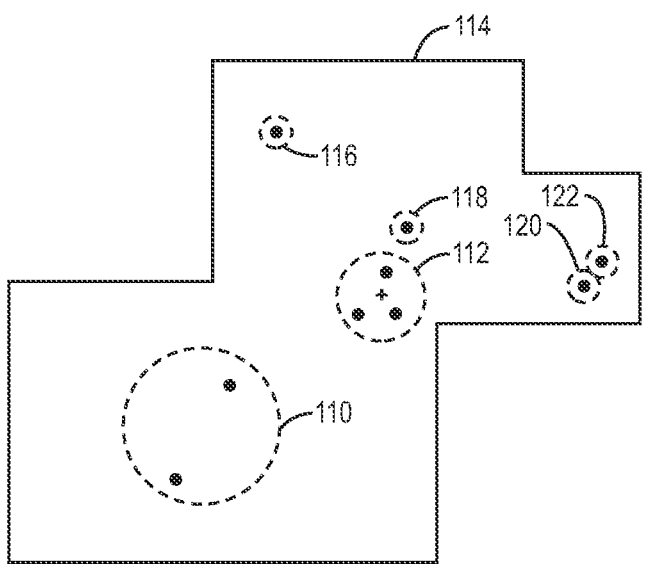

Since the old bounding region 106 and the new bounding region 108 overlap, the crowd analyzer 58 combines the new and old bounding regions 106 and 108 to provide a combined bounding region 114, as illustrated in FIG. 11B. In addition, the crowd analyzer 58 creates crowds 116 through 122 for individual users currently located within the combined bounding region 114. The optimal inclusion distances of the crowds 116 through 122 are set to the initial optimal inclusion distance computed by the crowd analyzer 58 based on user density.

Figure 11C:
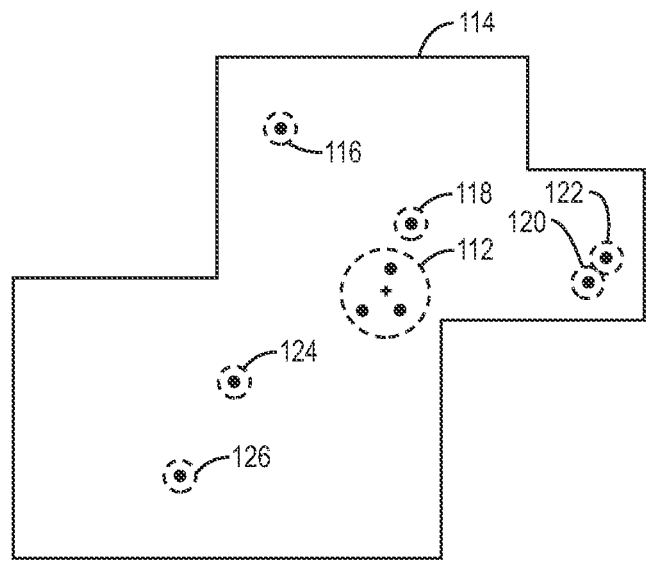

Next, the crowd analyzer 58 analyzes the crowds 110, 112, and 116 through 122 to determine whether any members of the crowds 110, 112, and 116 through 122 violate the optimal inclusion distances of the crowds 110, 112, and 116 through 122. In this example, as a result of the user leaving the crowd 110 and moving to his new location, both of the remaining members of the crowd 110 violate the optimal inclusion distance of the crowd 110. As such, the crowd analyzer 58 removes the remaining users from the crowd 110 and creates crowds 124 and 126 of one user each for those users, as illustrated in FIG. 11C.

Figure 11D:
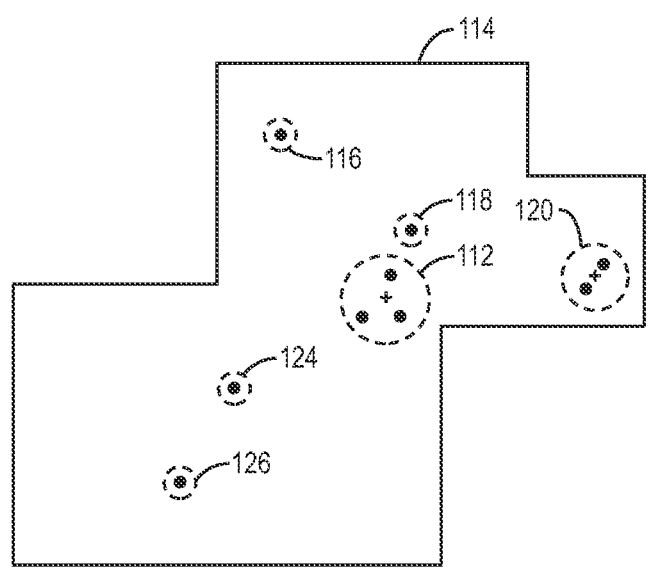

The crowd analyzer 58 then identifies the two closest crowds in the combined bounding region 114, which in this example are the crowds 120 and 122. Next, the crowd analyzer 58 computes a distance between the two crowds 120 and 122. In this example, the distance between the two crowds 120 and 122 is less than the initial optimal inclusion distance and, as such, the two crowds 120 and 122 are combined. In this example, crowds are combined by merging the smaller crowd into the larger crowd. Since the two crowds 120 and 122 are of the same size, the crowd analyzer 58 merges the crowd 122 into the crowd 120, as illustrated in FIG. 11D. A new crowd center and new optimal inclusion distance are then computed for the crowd 120.

Figure 11E:
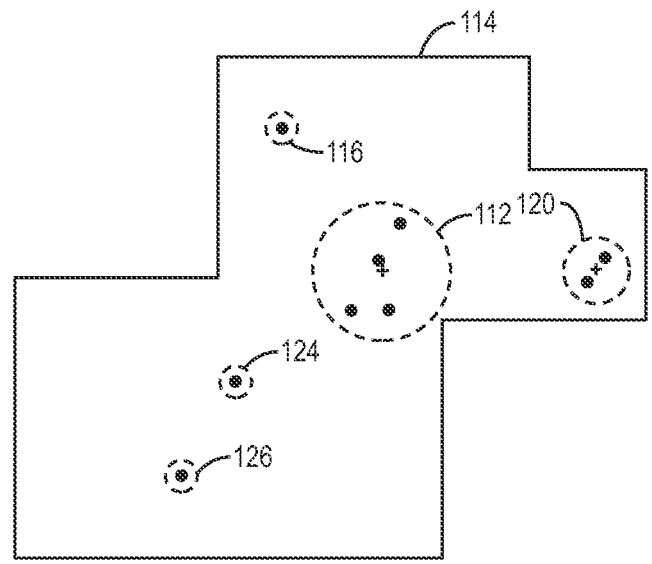
Figure 11F:
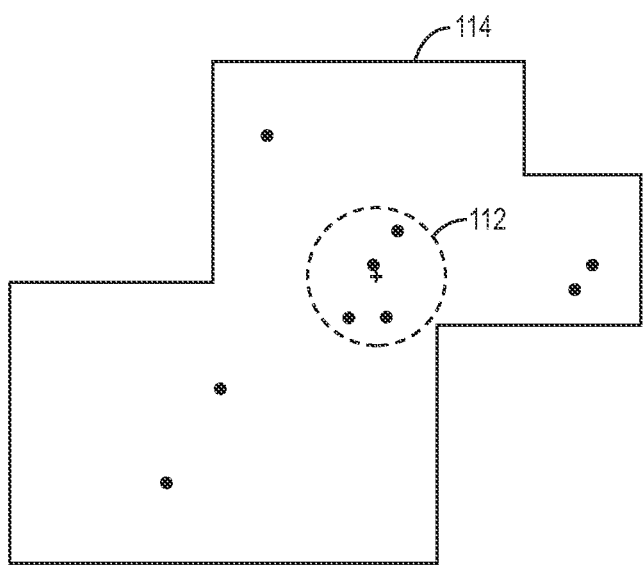

At this point, the crowd analyzer 58 repeats the process and determines that the crowds 112 and 118 are now the two closest crowds. In this example, the distance between the two crowds 112 and 118 is less than the optimal inclusion distance of the larger of the two crowds 112 and 118, which is the crowd 112. As such, the crowd 118 is merged into the crowd 122 and a new crowd center and optimal inclusion distance are computed for the crowd 112, as illustrated in FIG. 11E. At this point, there are no two crowds closer than the optimal inclusion distance of the larger of the two crowds. As such, the crowd analyzer 58 discards any crowds having less than three members, as illustrated in FIG. 11F. In this example, the crowds 116, 120, 124, and 126 have less than three members and are therefore removed. The crowd 112 has three or more members and, as such, is not removed. At this point, the crowd formation process is complete.

Figure 12A:
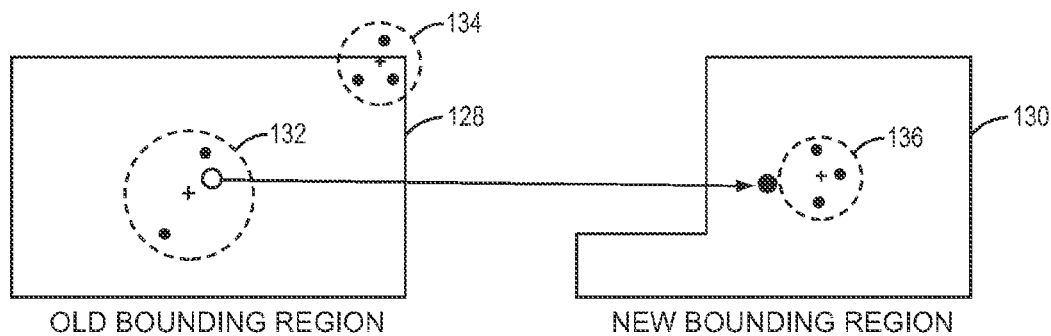

FIGS. 12A through 12E graphically illustrate the crowd formation process of FIGS. 6A through 6D in a scenario where the new and old bounding regions do not overlap. As illustrated in FIG. 12A, in this example, the user moves from an old location to a new location. The crowd analyzer 58 creates an old bounding region 128 for the old location of the user 20 and a new bounding region 130 for the new location of the user 20. In this example, the user 20 is moving from, for example, an old location within the physical boundaries of a POI to a new location just outside the POI. As a result, the old bounding region 128 is limited to the physical boundaries of the POI. Similarly, the new bounding region 130 excludes a region corresponding to a portion of area within the physical boundaries of the POI that overlap the initial bounding box from which the new bounding region 130 is created. Crowds 132 and 134 exist in the old bounding region 128, and crowd 136 exists in the new bounding region 130. In this example, since the old and new bounding regions 128 and 130 do not overlap, the crowd analyzer 58 processes the old and new bounding regions 128 and 130 separately.

Figure 12B:
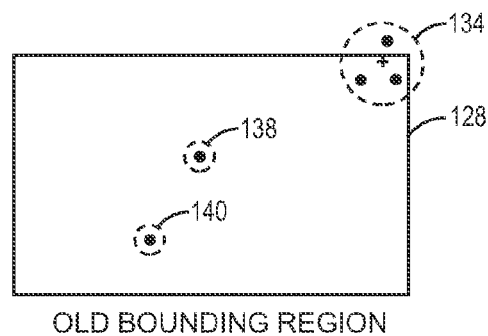
Figure 12C:
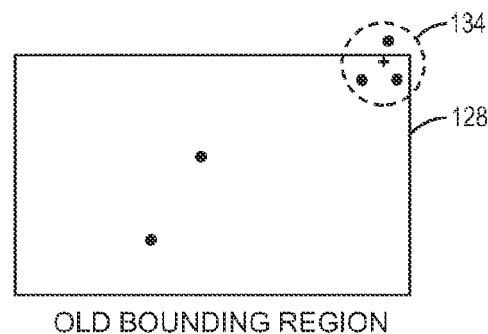

More specifically, as illustrated in FIG. 12B, as a result of the movement of the user 20 from the old location to the new location, the remaining users in the crowd 132 no longer satisfy the optimal inclusion distance for the crowd 132. As such, the remaining users in the crowd 132 are removed from the crowd 132, and crowds 138 and 140 of one user each are created for the removed users as shown in FIG. 12B. In this example, no two crowds in the old bounding region 128 are close enough to be combined. As such, crowds having less than three users are removed, and processing of the old bounding region 128 is complete as illustrated in FIG. 12C, and the crowd analyzer 58 proceeds to process the new bounding region 130.

Figure 12D:
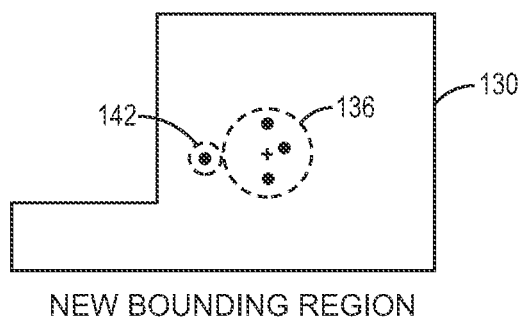
Figure 12E:
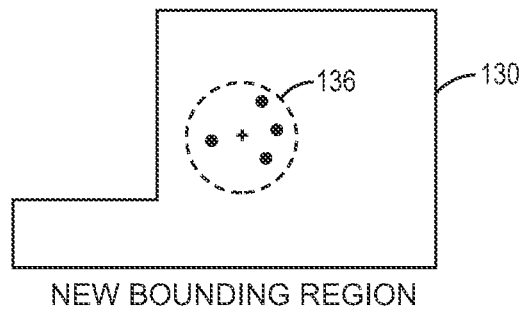

As illustrated in FIG. 12D, processing of the new bounding region 130 begins by the crowd analyzer 58 creating a crowd 142 of one user for the user 20. The crowd analyzer 58 then identifies the crowds 136 and 142 as the two closest crowds in the new bounding region 130 and determines a distance between the two crowds 136 and 142. In this example, the distance between the two crowds 136 and 142 is less than the optimal inclusion distance of the larger crowd, which is the crowd 136. As such, the crowd analyzer 58 combines the crowds 136 and 142 by merging the crowd 142 into the crowd 136, as illustrated in FIG. 12E. A new crowd center and new optimal inclusion distance are then computed for the crowd 136. At this point, the crowd formation process is complete.

The crowds formed using the process described above may be used to provide any type of desired service. For instance, in one embodiment, the MAP server 12 may process crowd requests from the mobile devices 18, the subscriber device 22, and/or the third-party service 26. Using the mobile device 18-1 as an example, the mobile device 18-1 may send a crowd data request to the MAP server 12 for a particular POI or AOI. The MAP server 12 then identifies a crowd(s) at the POI or within the AOI, generates crowd data for the identified crowd (s), and returns the crowd data to the mobile device 18-1. The crowd data for a crowd may include an aggregate profile of the crowd created from the user profile of the users in the crowd. However, the crowd data is not limited thereto. Further note that snapshots of the crowds may be captured and stored over time to enable a crowd tracking feature. Each crowd snapshot may include, for example, location information defining the location of the crowd at the corresponding point in time and an aggregate profile of the crowd at the corresponding point in time.

FIG. 13 illustrates an exemplary process performed by the MAP server 12 during which an owner or other user associated with a POI defines physical boundaries and POI specific crowd formation rules according to one embodiment of the present disclosure. First, the MAP server 12, and more specifically the crowd analyzer 58, receives user input selecting or defining a POI (step 1500). More specifically, in one embodiment, the owner (or other user) accesses the MAP server 12 over the network 28 via an associated computing device (e.g., a personal computer). The owner then selects the POI from an existing collection of POIs known to the MAP server 12 or defines the POI by, for example, entering a name of the POI and the location of the POI. Next, the MAP server 12 receives user input from the owner that defines the physical boundaries of the POI (step 1502). In one exemplary embodiment, Google Maps Keyhole Markup Language (KML) or similar technology may be used to define the physical boundaries of the POI. The physical boundaries may be the 2D physical boundaries of the POI (e.g., physical boundaries in terms of latitude and longitude) or the 3D physical boundaries of the POI (e.g., physical boundaries in terms of latitude, longitude, and altitude).

Optionally, the MAP server 12 may receive user input from the owner that defines one or more rules for crowd formation to be used when forming crowds within the physical boundaries of the POI (step 1504). For example, the one or more rules may include a minimum user density for crowd formation, a minimum number of users required to be in a crowd, or the like. Lastly, the MAP server 12 stores or updates a POI record or similar data structure to store the physical boundaries of the POI and the one or more crowd formation rules for the POI, if any (step 1506). The POI record also includes the name and location of the POI. Note that crowds may be tagged with the name and, optionally, location of the corresponding POIs while the crowds are located within the physical boundaries of the POIs. These POI tags may then be removed from the crowds once the crowds are no longer located within the physical boundaries of the POIs.

FIG. 14 is a block diagram of the MAP server 12 according to one embodiment of the present disclosure. As illustrated, the MAP server 12 includes a controller 144 connected to memory 146, one or more secondary storage devices 148, and a communication interface 150 by a bus 152 or similar mechanism. The controller 144 is a microprocessor, digital Application Specific Integrated Circuit (ASIC), Field Programmable Gate Array (FPGA), or the like. In this embodiment, the controller 144 is a microprocessor, and the application layer 40, the business logic layer 42, and the object mapping layer 62 (FIG. 2) are implemented in software and stored in the memory 146 for execution by the controller 144. Further, the datastore 64 (FIG. 2) may be implemented in the one or more secondary storage devices 148. The secondary storage devices 148 are digital data storage devices such as, for example, one or more hard disk drives. The communication interface 150 is a wired or wireless communication interface that communicatively couples the MAP server 12 to the network 28 (FIG. 1). For example, the communication interface 150 may be an Ethernet interface, local wireless interface such as a wireless interface operating according to one of the suite of IEEE 802.11 standards, or the like.

FIG. 15 is a block diagram of one of the mobile devices 18 of FIG. 1 according to one embodiment of the present disclosure. This discussion is equally applicable to the other mobile devices 18. As illustrated, the mobile device 18 includes a controller 154 connected to memory 156, a communication interface 158, one or more user interface components 160, and the location function 36 by a bus 162 or similar mechanism. The controller 154 is a microprocessor, digital ASIC, FPGA, or the like. In this embodiment, the controller 154 is a microprocessor, and the MAP client 30, the MAP application 32, and the third-party applications 34 are implemented in software and stored in the memory 156 for execution by the controller 154. In this embodiment, the location function 36 is a hardware component such as, for example, a GPS receiver. The communication interface 158 is a wireless communication interface that communicatively couples the mobile device 18 to the network 28 (FIG. 1). For example, the communication interface 158 may be a local wireless interface such as a wireless interface operating according to one of the suite of IEEE 802.11 standards, a mobile communications interface such as a cellular telecommunications interface, or the like. The one or more user interface components 160 include, for example, a touchscreen, a display, one or more user input components (e.g., a keypad), a speaker, or the like, or any combination thereof.

The present disclosure provides substantial opportunity for variation without departing from the scope of the concepts disclosed herein. For example, the crowd formation process of FIGS. 6A through 6D is exemplary. Numerous variations to the crowd formation process in which physical boundaries are taken into account will be apparent to one of ordinary skill in the art upon reading this disclosure. For instance, rather than modifying the new and old bounding regions as described above with respect to FIGS. 7 and 8, the initial bounding region (e.g., the initial bounding box) may be used in combination with user and crowd filtering. Specifically, user and crowd filtering may be used to remove unwanted users and crowds prior to forming crowds. Thus, if the new location of the user is within the physical boundaries of a POI, an initial bounding region may be created without regards to the physical boundaries of the POI. Then, once users and crowds within the initial bounding region are identified, the users and crowds may be filtered prior to crowd formation in order to remove crowds and users that are outside the physical boundaries of the POI. In a similar manner, crowd and user filtering may be used when forming crowds in the situation where the new location is not within physical boundaries of a POI but a POI(s) having defined physical boundaries are nearby.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method comprising:
receiving, by a server, information identifying one or more known physical boundaries, wherein the one or more known physical boundaries comprise physical boundaries of a Point of Interest (POI);
obtaining, by the server, current locations of a plurality of users via a plurality of mobile devices, each of the plurality of users being a user of a corresponding one of the plurality of mobile devices;
determining, by the server, a subset of users from the plurality of users are located within the one or more known physical boundaries, based on a comparison of the current locations of the subset of users and the one or more known physical boundaries;
forming, by the server, a crowd including the subset of users from the plurality of users, wherein forming the crowd comprises performing a spatial crowd formation process for a bounding region limited to the physical boundaries of the POI, wherein forming the crowd further comprises forming the crowd based on the current locations of the subset of users and the one or more known physical boundaries such that the crowd does not include spatially proximate users that are currently located on opposite sides of the one or more known physical boundaries; and
generating, by the server, crowd data representing the subset of users included in the crowd.

2. The method of claim 1 wherein the one or more known physical boundaries comprise one or more intangible physical boundaries.

3. The method of claim 1 wherein the physical boundaries of the POI comprise tangible physical boundaries of the POI.

4. The method of claim 1 wherein the physical boundaries of the POI are 2-Dimensional (2D) physical boundaries of the POI.

5. The method of claim 1 wherein the physical boundaries of the POI are 3-Dimensional (3D) physical boundaries of the POI.

6. The method of claim 1 wherein forming the crowd comprises:
detecting a triggering event for a spatial crowd formation process, the triggering event being associated with one of the plurality of users;
determining that a current location of the one of the plurality of users is not within physical boundaries defined for any POI including the physical boundaries of the POI;
creating an initial bounding region for the spatial crowd formation process that encompasses the current location of the one of the plurality of users;
determining that the initial bounding region overlaps the physical boundaries of the POI;
excluding a region within the physical boundaries of the POI from the initial bounding region to provide a bounding region for the spatial crowd formation process; and
performing the spatial crowd formation process for the bounding region for the spatial crowd formation process based on the current locations of a second subset of the plurality of users within the bounding region for the spatial crowd formation process to thereby form the crowd including the subset of users.

7. The method of claim 6 wherein detecting the triggering event comprises receiving a location update for the current location of the one of the plurality of users.

8. The method of claim 1 wherein:
generating crowd data for the crowd includes generating an aggregate profile for the crowd; and the method further comprising
providing access to the crowd data.

9. A computer-implemented method comprising:
obtaining, by a server, current locations of a plurality of users via a plurality of mobile devices, each of the plurality of users being a user of a corresponding one of the plurality of mobile devices; and
forming, by the server, a crowd including a number of users from the plurality of users based on the current locations of the number of users and one or more known physical boundaries, wherein forming the crowd comprises:
- detecting, by the server, a triggering event for a spatial crowd formation process, the triggering event being associated with one of the plurality of users;
- determining, by the server, that a current location of the one of the plurality of users is within the physical boundaries of a Point of Interest (POI);
- creating, by the server, a bounding region for the spatial crowd formation process that encompasses the current location of the one of the plurality of users and is limited by the physical boundaries of the POI; and
- performing, by the server, the spatial crowd formation process for the bounding region based on the current locations of a subset of the plurality of users within the bounding region to thereby form the crowd including the number of users.

10. The method of claim 9 wherein detecting the triggering event comprises receiving a location update for the current location of the one of the plurality of users.

11. The method of claim 9 wherein performing the spatial crowd formation process comprises performing the spatial crowd formation process based on the current locations of the subset of the plurality of users within the bounding region and one or more crowd formation rules defined for the POI.

12. The method of claim 11 wherein the one or more crowd formation rules defined for the POI comprise a minimum user density for crowd formation.

13. The method of claim 11 wherein the one or more crowd formation rules defined for the POI comprise a minimum number of users required for a crowd.

14. The method of claim 9 further comprising tagging the crowd with information that identifies the POI as long as the crowd remains located within the physical boundaries of the POI.

15. A server comprising:
- a communication interface adapted to communicatively couple the server to a plurality of mobile devices via a network; and
- a controller associated with the communication interface and adapted to:
  - receive information identifying one or more known physical boundaries, wherein the one or more known physical boundaries comprise physical boundaries of a Point of Interest (POI);
  - obtain current locations of a plurality of users via the plurality of mobile devices, each of the plurality of users being a user of a corresponding one of the plurality of mobile devices;
  - determine a subset of users from the plurality of users are located within the one or more known physical boundaries, based on a comparison of the current locations of the subset of users and the one or more known physical boundaries;
  - form a crowd including the subset of users from the plurality of users, wherein the crowd is formed based on the current locations of the subset of users and the one or more known physical boundaries such that the crowd does not include spatially proximate users that are currently located on opposite sides of the one or more known physical boundaries and wherein, in order to form the crowd, the controller is further adapted to perform a spatial crowd formation process for a bounding region limited to the physical boundaries of the POI; and
  - generate crowd data representing the subset of users included in the crowd.

16. The server of claim 15 wherein the one or more known physical boundaries comprise one or more intangible physical boundaries.

17. The server of claim 15 wherein the physical boundaries of the POI comprise tangible physical boundaries of the POI.

18. The server of claim 15 wherein the physical boundaries of the POI are 2-Dimensional (2D) physical boundaries of the POI.

19. The server of claim 15 wherein the physical boundaries of the POI are 3-Dimensional (3D) physical boundaries of the POI.

20. The server of claim 15 wherein, in order to form the crowd, the controller is further adapted to:
- detect a triggering event for a spatial crowd formation process, the triggering event being associated with one of the plurality of users;
- determine that a current location of the one of the plurality of users is not within physical boundaries defined for any POI including the physical boundaries of the POI;
- create an initial bounding region for the spatial crowd formation process that encompasses the current location of the one of the plurality of users;
- determine that the initial bounding region overlaps the physical boundaries of the POI;
- exclude a region within the physical boundaries of the POI from the initial bounding region to provide a bounding region for the spatial crowd formation process; and
- perform the spatial crowd formation process for the bounding region for the spatial crowd formation process based on the current locations of a subset of the plurality of users within the bounding region for the spatial crowd formation process to thereby form the crowd including the subset of users.

21. The server of claim 20 wherein, in order to detect the triggering event, the controller is further adapted to receive a location update for the current location of the one of the plurality of users.

22. The server of claim 15 wherein the controller is further adapted to: generate crowd data for the crowd, the crowd data including an aggregate profile for the crowd; and
provide access to the crowd data.

23. A server comprising:
- a communication interface adapted to communicatively couple the server to a plurality of mobile devices via a network; and
- a controller associated with the communication interface and adapted to:
  - obtain current locations of a plurality of users of the plurality of mobile devices, each of the plurality of users being a user of a corresponding one of the plurality of mobile devices; and
  - form a crowd including a number of users from the plurality of users based on the current locations of the number of users and one or more known physical boundaries, wherein, in order to form the crowd, the controller is further adapted to:
    - detect a triggering event for a spatial crowd formation process, the triggering event being associated with one of the plurality of users;
    - determine that a current location of the one of the plurality of users is within the physical boundaries of a Point of Interest (POI);
    - create a bounding region for the spatial crowd formation process that encompasses the current location of the one of the plurality of users and is limited by the physical boundaries of the POI; and perform the spatial crowd formation process for the bounding region based on the current locations of a subset of the plurality of users within the bounding region to thereby form the crowd including the number of users.

24. The server of claim 23 wherein, in order to detect the triggering event, the controller is further adapted to receive a location update for the current location of the one of the plurality of users.

25. The server of claim 23 wherein the controller is further adapted to perform the spatial crowd formation process based on the current locations of the subset of the plurality of users within the bounding region and one or more crowd formation rules defined for the POI.

26. The server of claim 25 wherein the one or more crowd formation rules defined for the POI comprise a minimum user density for crowd formation.

27. The server of claim 25 wherein the one or more crowd formation rules defined for the POI comprise a minimum number of users required for a crowd.

28. The server of claim 23 wherein the controller is further adapted to tag the crowd with information that identifies the POI as long as the crowd remains located within the physical boundaries of the POI.

\* \* \* \* \*